(12) United States Patent
Kim

(10) Patent No.: US 11,483,889 B2
(45) Date of Patent: Oct. 25, 2022

(54) METHOD AND DEVICE FOR RECOVERING CONNECTION FAILURE TO NETWORK IN NEXT GENERATION MOBILE COMMUNICATION SYSTEM

(71) Applicant: Samsung Electronics Co., Ltd., Suwon-si (KR)

(72) Inventor: Donggun Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 88 days.

(21) Appl. No.: 16/826,854

(22) Filed: Mar. 23, 2020

(65) Prior Publication Data

US 2020/0305216 A1 Sep. 24, 2020

(30) Foreign Application Priority Data

| Mar. 22, 2019 | (KR) | 10-2019-0032958 |
| Apr. 5, 2019 | (KR) | 10-2019-0040170 |
| Apr. 29, 2019 | (KR) | 10-2019-0049732 |
| Sep. 2, 2019 | (KR) | 10-2019-0108442 |
| Sep. 27, 2019 | (KR) | 10-2019-0119932 |

(51) Int. Cl.
*H04W 76/18* (2018.01)
*H04W 76/19* (2018.01)

(52) U.S. Cl.
CPC ........... *H04W 76/18* (2018.02); *H04W 76/19* (2018.02)

(58) Field of Classification Search
CPC ...... H04W 76/15; H04W 76/18; H04W 76/19
See application file for complete search history.

(56) References Cited

U.S. PATENT DOCUMENTS

| 2016/0057800 A1 | 2/2016 | Ingale et al. |
| 2018/0368018 A1 | 12/2018 | Kim et al. |
| 2020/0059395 A1* | 2/2020 | Chen .................. H04L 43/0811 |
| 2020/0169899 A1* | 5/2020 | Xiao ..................... H04W 24/02 |
| 2020/0260347 A1* | 8/2020 | Xu ...................... H04W 36/0069 |
| 2020/0351968 A1* | 11/2020 | Yilmaz ................ H04W 76/15 |

(Continued)

FOREIGN PATENT DOCUMENTS

| KR | 10-2018-0137385 A | 12/2018 | |
| WO | WO-2020150998 A1 * | 7/2020 | ............ H04W 36/00 |

OTHER PUBLICATIONS

Catt, 'Discussion on requirements for fast recovery enhancements', R2-1900214, 3GPP TSG-RAN WG2 Meeting #105, sections 1-2, Feb. 15, 2019.

(Continued)

*Primary Examiner* — Habte Mered
(74) *Attorney, Agent, or Firm* — Jefferson IP Law, LLP

(57) ABSTRACT

The disclosure relates to a communication method and system for converging a 5th-Generation (5G) communication system for supporting higher data rates beyond a 4th-Generation (4G) system with a technology for Internet of Things (IoT). The disclosure may be applied to intelligent services based on the 5G communication technology and the IoT-related technology, such as smart home, smart building, smart city, smart car, connected car, health care, digital education, smart retail, security and safety services. The disclosure relates to a method and a device for quickly recovering a connection to a network in a next-generation mobile communication system when the connection to the network fails.

16 Claims, 10 Drawing Sheets

(56) References Cited

U.S. PATENT DOCUMENTS

2021/0127447 A1* 4/2021 Zhang .................. H04W 80/02
2021/0168690 A1* 6/2021 Zheng .................. H04W 76/15
2021/0203543 A1* 7/2021 Koskinen ............. H04W 76/15

OTHER PUBLICATIONS

Samsung, 'Scenarios of Fast Recovery', R2-1902182, 3GPP TSG-RAN WG2 Meeting #105, sections 2.1-2.2, Feb. 15, 2019.
Qualcomm Incorporated, 'Fast Recovery from MCG failure', R2-1900113, 3GPP TSG-RAN WG2 Meeting #105, section 2, Feb. 15, 2019.
Vivo, 'Fast recovery of MCG link',R2-1900265, 3GPP TSG-RAN WG2#105, section 2, Feb. 15, 2019.
International Search Report dated Jun. 26, 2020, issued in International Application No. PCT/KR2020/003936.
Extended European Search Report dated Jan. 14, 2022, issued in a counterpart European Application No. 20777988.5.
Zte Corporation et al: "MCG failure report procedure in MR-DC", 3GPP Draft; R2-1900805-MCG Failure Report Procedure in MR-DC, 3rd Generation Partnership Project (3GPP), Mobile Competence Centre ; 650, Route Des Lucioles ; F-06921 Sophia-Antipolis Cedex; France vol. RAN WG2, No. XP051602179; Feb. 15, 2019, Athens, Greece.
Oppo: "the open issues to support fast recovery for MR-DC enhancement",3GPP Draft; R2-1900463—The Open Issues To Support Fast Recovery for MR-DC Enhancement, 3rd Generation Partnership Project (3GPP), Mobile Competence Centre; 650, Route Des Lucioles ; F-06921 Sophia-A vol. RAN WG2, No. XP051601854, Feb. 15, 2019, Athens, Greece.
Ericsson: "Fast MCG recovery in MR-DC", 3GPP Draft; R2-1901413—Fast MCG Recovery in MR-DC, 3rd Generation Partnership Project (3GPP), Mobile Competence Centre ; 650, Route Des Lucioles ; F-06921 Sophia-Antipolis Cedex ; France vol. RAN WG2, No. XP051602772, Feb. 14, 2019, Athens, Greece.

* cited by examiner

METHOD AND DEVICE FOR RECOVERING CONNECTION FAILURE TO NETWORK IN NEXT GENERATION MOBILE COMMUNICATION SYSTEM

CROSS-REFERENCE TO RELATED APPLICATION(S)

This application is based on and claims priority under 35 U.S.C. § 119 of a Korean patent application number 10-2019-0032958, filed on Mar. 22, 2019, in the Korean Intellectual Property Office, and of a Korean patent application number 10-2019-0040170, filed on Apr. 5, 2019, in the Korean Intellectual Property Office, and of a Korean patent application number 10-2019-0049732, filed on Apr. 29, 2019, in the Korean Intellectual Property Office, and of a Korean patent application number 10-2019-0108442, filed on Sep. 2, 2019, in the Korean Intellectual Property Office, and of a Korean patent application number 10-2019-0119932, filed on Sep. 27, 2019, in the Korean Intellectual Property Office, the disclosure of each of which is incorporated by reference herein in its entirety.

BACKGROUND

1. Field

The disclosure relates to a method and a device for quickly recovering a network connection failure which has occurred in a next-generation mobile communication system.

2. Description of Related Art

To meet the demand for wireless data traffic having increased since deployment of 4$^{th}$ generation (4G) communication systems, efforts have been made to develop an improved 5$^{th}$ generation (5G) or pre-5G communication system. Therefore, the 5G or pre-5G communication system is also called a "Beyond 4G Network" or a "Post long-term evolution (LTE) System". The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G communication systems. In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like. In the 5G system, hybrid frequency shift keying (FSK) and quadrature amplitude modulation (QAM) modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have also been developed.

The Internet, which is a human centered connectivity network where humans generate and consume information, is now evolving to the Internet of things (IoT) where distributed entities, such as things, exchange and process information without human intervention. The Internet of everything (IoE), which is a combination of the IoT technology and the big data processing technology through connection with a cloud server, has emerged. As technology elements, such as "sensing technology", "wired/wireless communication and network infrastructure", "service interface technology", and "security technology" have been demanded for IoT implementation, a sensor network, a machine-to-machine (M2M) communication, machine type communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies such as a sensor network, machine type communication (MTC), and machine-to-machine (M2M) communication may be implemented by beamforming, MIMO, and array antennas. Application of a cloud radio access network (RAN) as the above-described big data processing technology may also be considered an example of convergence of the 5G technology with the IoT technology.

In order to support a service having a high data-transmission rate and a low transmission delay in a next-generation mobile communication system, a base station is required to quickly configure carrier aggregation (CA) or dual connectivity (DC) for a terminal.

The above information is presented as background information only to assist with an understanding of the disclosure. No determination has been made, and no assertion is made, as to whether any of the above might be applicable as prior art with regard to the disclosure.

SUMMARY

In the case where carrier aggregation or dual connectivity are configured for a terminal, when a connection failure occurs in a Pcell or Pscell (Spcell), an S cell, a master cell group (MCG) in dual connectivity, or a secondary cell group (SCG) in dual connectivity, data loss and a data transmission delay may occur even in a cell or a cell group in which a connection is maintained, provided that the terminal and a network are completely disconnected.

In order to support a service having a high data-transmission rate and a low transmission delay in a next-generation mobile communication system, a base station is required to quickly configure carrier aggregation (CA) or dual connectivity (DC) for a terminal. In the case where carrier aggregation or dual connectivity are configured for a terminal, a connection failure may occur in a Pcell or Pscell (Spcell), an Scell, a master cell group (MCG) in dual connectivity, or a secondary cell group (SCG) in dual connectivity.

Aspects of the disclosure are to address at least the above-mentioned problems and/or disadvantages and to provide at least the advantages described below. Accordingly, an aspect of the disclosure is to provide a method for recovering a connection to a cell or a cell group in which a connection is maintained or adding a novel connection without completely disconnecting the terminal and a network. In accordance with an aspect of the disclosure, a method by a terminal in a wireless communication system, the method comprising: detecting, from a master cell group (MCG), an MCG radio link failure; transmitting, to a secondary cell group (SCG), an MCG radio link failure report through a split signaling radio bearer (SRB)1 or an SRB3 in case that the MCG radio link failure is detected; and starting a timer in case that the MCG radio link failure report is transmitted to the SCG.

In an embodiment, wherein the transmitting of the MCG radio link failure report comprises transmitting the MCG radio link failure report via the split SRB1 in case that both the split SRB1 and the SRB3 are configured.

In an embodiment, further comprising: stopping the timer in case that a response is received from the MCG.

In an embodiment, further comprising: triggering a radio resource control (RRC) connection re-establishment procedure in case that the timer expires.

In an embodiment, further comprising: triggering a radio resource control (RRC) connection re-establishment procedure in case that an SCG radio link failure (SCG RLF) occurs while the timer operates.

In accordance with another aspect of the disclosure, a method by a secondary cell group (SCG) in a wireless communication system, the method comprising: receiving, from a terminal, a master cell group (MCG) radio link failure report through a split signaling radio bearer (SRB)1 or an SRB3 in case that the MCG radio link failure is detected, wherein a timer is started by the terminal in case that the MCG radio link failure report is received from the terminal.

In accordance with another aspect of the disclosure, a terminal comprising: a transceiver to transmit and receive at least one signal; and at least one processor coupled to the transceiver, and configured to: detect, from a master cell group (MCG), an MCG radio link failure, control the transceiver to transmit, to a secondary cell group (SCG), an MCG radio link failure report through a split signaling radio bearer (SRB)1 or an SRB3 in case that the MCG radio link failure is detected, and control a timer to start in case that the MCG radio link failure report is transmitted to the SCG.

In accordance with another aspect of the disclosure, a secondary cell group (SCG) comprising: a transceiver to transmit and receive at least one signal; and at least one processor coupled to the transceiver, and configured to: receive, from a terminal, a master cell group (MCG) radio link failure report through a split signaling radio bearer (SRB)1 or an SRB3 in case that the MCG radio link failure is detected; and control a timer to be started by the terminal in case that the MCG radio link failure report is received from the terminal.

Additional aspects will be set forth in part in the description which follows and, in part, will be apparent from the description, or may be learned by practice of the presented embodiments.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1A:
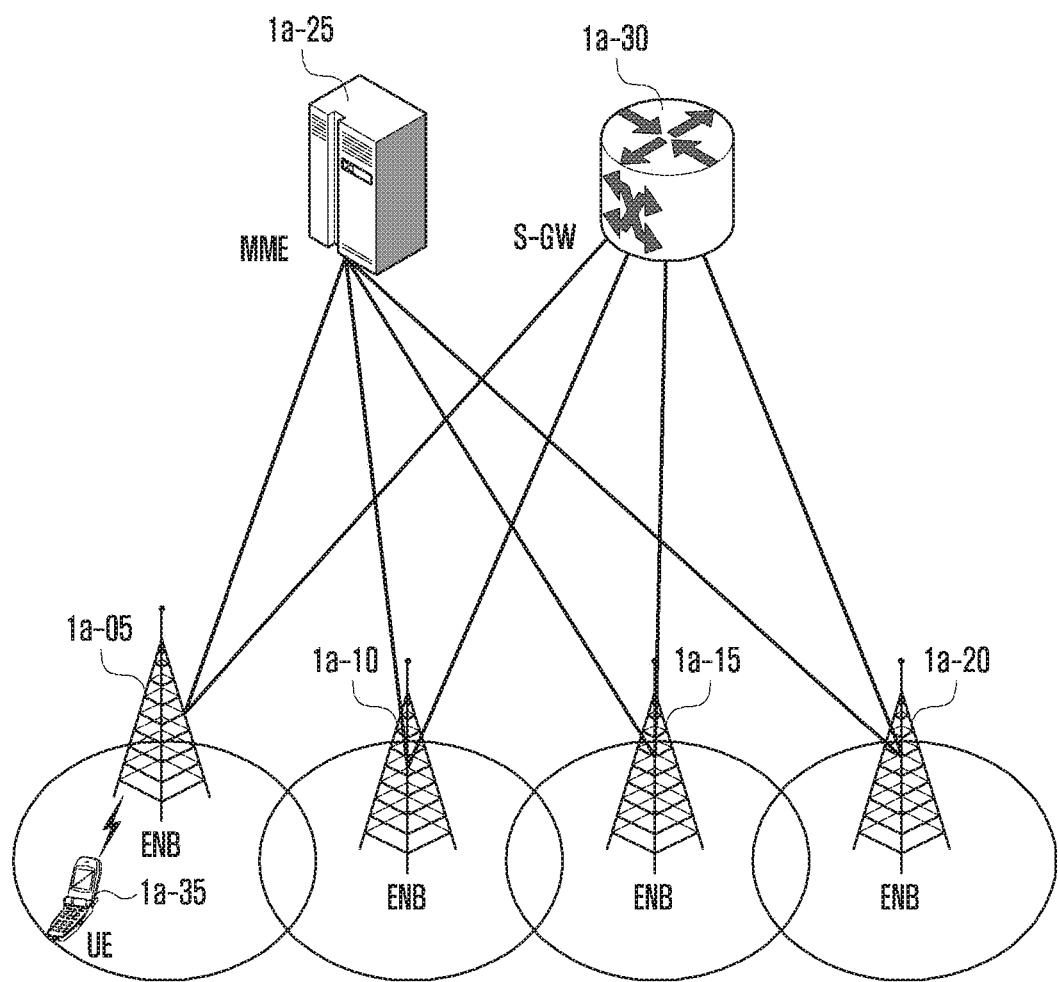
FIG. 1A illustrates a structure of a long term evolution (LTE) system to which the disclosure can be applied according to an embodiment of the disclosure.

The following description with reference to the accompanying drawings is provided to assist in a comprehensive understanding of various embodiments the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In the following description, terms for identifying access nodes, terms referring to network entities, terms referring to messages, terms referring to interfaces between network entities, terms referring to various identification information, and the like are illustratively used for the sake of convenience. Therefore, the disclosure is not limited by the terms as used below, and other terms referring to subjects having equivalent technical meanings may be used.

In the following description, the disclosure uses terms and names defined in 3rd generation partnership project long term evolution (3GPP LTE) standards for the convenience of description. However, the disclosure is not limited by these terms and names, and may be applied in the same way to systems that conform other standards. In the disclosure, the term "eNB" may be used interchangeably with the term "gNB". That is, a base station described as "eNB" may refer to "gNB".

The disclosure considers a terminal in which carrier aggregation (CA) or dual connectivity (DC) is configured and specifies a method presented by using the following terms.

Primary Cell (Pcell): A Pcell is a serving cell in which a terminal configures an initial connection to a base station. The Pcell is used to transmit and receive an important radio resource control (RRC) message and thereby configure a connection. Further, the Pcell always has a physical uplink control channel (PUCCH) transmission resource and thus can indicate hybrid automatic repeat request (HARQ) acknowledgement (ACK) or negative-acknowledgement (NACK), has an uplink and a downlink which are always configured, and can be used as a reference cell for timing advance (primary timing advance group (pTAG)). For example, when a Pcell is configured and then an S cell is added by configuring carrier aggregation, the Scell may perform uplink data transmission with reference to a timing advance value of the Pcell. Further, when dual connectivity is configured, the Pcell is a Pcell of a master cell group (MCG).

Master cell group (MCG): An MCG is a group of cells supported by a base station or serving cells used when a terminal configures an initial connection to a base station. When dual connectivity is configured, main RRC messages are transmitted or received through the MCG.

Secondary cell group (SCG): A terminal configures a connection to a base station and can add cells of another base station in addition to an MCG. An SCG is a group of cells supported by the other base station. When dual connectivity is configured, an SCG may be added in order to increase an additional data transmission rate or to efficiently support mobility of a terminal.

Primary secondary cell (Pscell): When a terminal configures a connection to a base station, a group of cells of another base station in addition to an MCG is added, and dual connectivity is configured, a cell corresponding to a Pcell in an SCG is called a Pscell.

Secondary cell (Scell): An Scell is a cell additionally configured by a base station so that a terminal configures an initial connection to the base station and then configures carrier aggregation. The Scell may have a PUCCH transmission resource according to a base station configuration, may have an uplink and a downlink which are configured according to the base station configuration. Further, the Scell may be used as a reference cell for a timing advance Secondary Timing Advance Group (sTAG) according to the base station configuration. For example, when a Pcell is configured, Scells are added by configuring carrier aggregation, and an sTAG is configured, other Scells of the sTAG may perform uplink data transmission with reference to a timing advance value of a designated Scell. Further, when dual connectivity is configured for a terminal, an Scell may be Scells other than a Pcell of an MCG or S cells other than a Pscell of an SCG.

When a terminal, in which carrier aggregation or dual connective is configured, fails to makes a wireless connection to a base station (or a cell) in a Pcell, an MCG, an SCG, or an Scell (e.g. radio link failure), there may be a cell (a Pcell, a Pscell, or an S cell) or a cell group (MCG or SCG) maintaining a wireless connection to the base station (or the cell) among the Pcell, the MCG, the SCG, or the Scell. In relation to this case, the disclosure proposes a method for not completely releasing the connection and remaking a connection but recovering a disconnected cell or cell group or configuring a novel connection while continuing to perform data transmission/reception to/from a cell or cell group to which a wireless connection is maintained. The disclosure also proposes a method for replacing an existing cell or a cell group, to which a connection is maintained, with a Pcell or an MCG.

The disclosure proposes efficient procedures in consideration of the following embodiments.

A first embodiment considers the case in which a terminal, in which dual connectivity is configured, maintains a connection to a base station (or a cell) in an MCG and fails to make a wireless connection to the base station (or the cell) in an SCG.

A second embodiment considers the case in which a terminal, in which dual connectivity is configured, maintains a connection to a base station (or a cell) in an SCG and fails to make a wireless connection to the base station (or the cell) in an MCG.

A third embodiment considers the case in which a terminal, in which carrier aggregation is configured, maintains a connection to a base station (or a cell) in a Pcell or Pscell (when dual connectivity is also configured) and fails to make a wireless connection to the base station (or the cell) in an Scell.

In a fourth embodiment, it is taken into consideration that a terminal, in which carrier aggregation is configured, maintains a connection to a base station (or a cell) in an Scell and fails to make a wireless connection to the base station (or the cell) in a Pcell or a Pscell (in which dual connectivity is also configured)

The above embodiments may also be extended and applied to the case where both carrier aggregation and dual connectivity are configured.

Hereinafter, proposed are a specific method, an efficient operation of a base station, or an efficient operation of a terminal with respect to the above embodiments of the disclosure.

FIG. 1A illustrates a structure of a long term evolution (LTE) system to which the disclosure can be applied according to an embodiment of the disclosure.

Referring to FIG. 1A, a radio access network of an LTE system includes an evolved Node B (hereinafter, "ENB", "Node B", or "base station") (1a-05, 1a-10, 1a-15, or 1a-20) and a mobility management entity (MME) 1a-25, and a serving-gateway (S-GW) 1a-30. A user equipment (hereinafter, "UE" or "terminal") 1a-35 is connected to an external network through an ENB 1a-05, 1a-10, 1a-15, or 1a-20 and the S-GW 1a-30.

In FIG. 1A, the ENB 1a-05, 1a-10, 1a-15, or 1a-20 correspond to an existing node B of a universal mobile telecommunications system (UNITS) system. An ENB is connected to the UE 1a-35 via a wireless channel and may play the more complicated role than the existing node B. In an LTE system, all user traffics including a real-time service, such as voice over IP (VoIP) via an Internet protocol, are provided through a shared channel. Thus, there is a need for a device for collecting and scheduling state information (such as a buffer state, an available transmission power state, a channel state, etc.) of UEs, and the ENB 1a-05, 1a-10, 1a-15, or 1a-20 functions as such a device. One ENB may normally control multiple cells. For example, in order to implement a transmission speed of 100 Mbps, the LTE system uses orthogonal frequency division multiplexing (hereinafter, referred to as "OFDM") as a radio access technique in a 20 MHz bandwidth. Further, an adaptive modulation & coding (hereinafter, referred to as "AMC") scheme for determining a modulation scheme and a channel coding rate in accordance with a channel state of a terminal is applied. The S-GW 1a-30 is a device for providing a data bearer and generates or removes a data bearer according to a control of the MME 1a-25. The MME is a device for various types of control functions in addition to a mobility management function for a terminal, and is connected to multiple base stations.

Figure 1B:
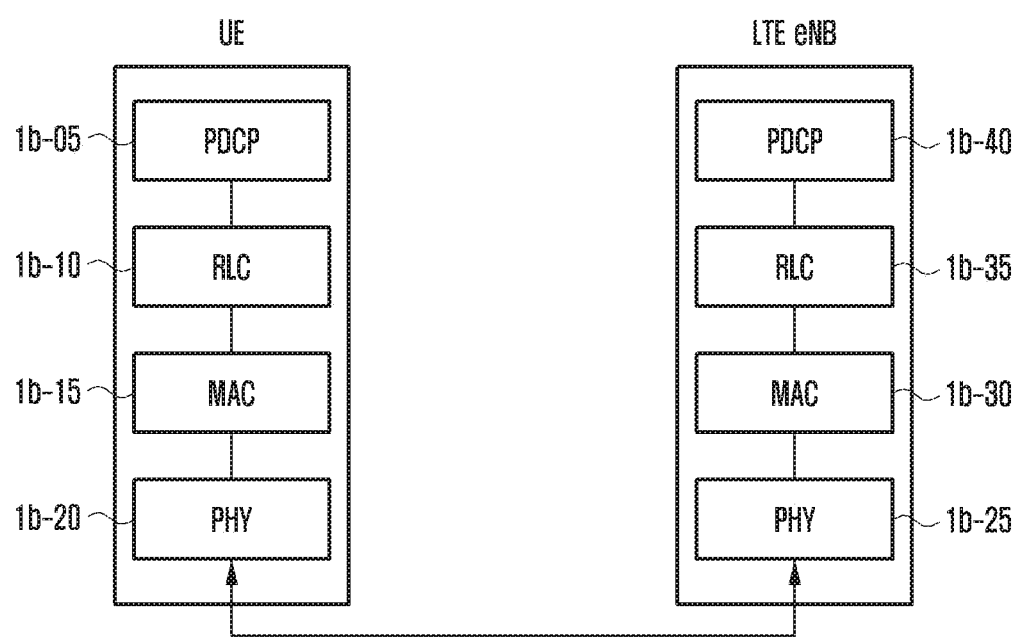
FIG. 1B illustrates a wireless protocol architecture in an LTE system to which the disclosure can be applied according to an embodiment of the disclosure.

FIG. 1B illustrates a wireless protocol architecture in an LTE system to which the disclosure can be applied according to an embodiment of the disclosure.

Referring to FIG. 1B, a wireless protocol of the LTE system includes packet data convergence protocols (PDCPs) 1b-05 and 1b-40, radio link controls (RLC) 1b-10 and 1b-35, and medium access controls (MACs) 1b-15 and 1b-30 in a terminal and an ENB, respectively. The PDCPs 1b-05 and 1b-40 performs operations such as IP header compression/recovery, etc. Main functions of the PDCPs may be summarized as follows:

Header compression and decompression: ROHC only
Transfer of user data
In-sequence delivery of upper layer PDUs at PDCP re-establishment procedure for RLC AM
For split bearers in DC (only support for RLC AM): PDCP PDU routing for transmission and PDCP PDU reordering for reception
Duplicate detection of lower layer SDUs at PDCP re-establishment procedure for RLC AM
Retransmission of PDCP SDUs at handover and, for split bearers in DC, of PDCP PDUs at PDCP data-recovery procedure, for RLC AM
Ciphering and deciphering
Timer-based SDU discard in uplink The radio link control (hereinafter, referred to as "RLC") 1b-10 and 1b-35 reconstruct a PDCP packet data unit (PDCP PDU) into an appropriate size and performs an ARQ operation, etc. Main functions of the RLCs may be summarized as follows:

Transfer of upper layer PDUs
Error Correction through ARQ (only for AM data transfer)
Concatenation, segmentation and reassembly of RLC SDUs (only for UM and AM data transfer)
Re-segmentation of RLC data PDUs (only for AM data transfer)
Reordering of RLC data PDUs (only for UM and AM data transfer)
Duplicate detection (only for UM and AM data transfer)
Protocol error detection (only for AM data transfer)
RLC SDU discard (only for UM and AM data transfer)
RLC re-establishment The MACs 1b-15 and 1b-30 are connected to multiple RLC layer devices included in one terminal, and multiplex and demultiplex RLC PDUs into and from an MAC PDU. Main functions of the MACs of may be summarized as follows:

Mapping between logical channels and transport channels
Multiplexing/demultiplexing of MAC SDUs belonging to one or different logical channels into/from transport blocks (TB) delivered to/from the physical layer on transport channels)
Scheduling information reporting
Error correction through HARQ
Priority handling between logical channels of one UE
Priority handling between UEs by means of dynamic scheduling
MBMS service identification
Transport format selection
Padding Physical layers 1b-20 and 1b-25 channel-code and modulate upper layer data into an OFDM symbol and transmit the same through a wireless channel, or demodulate and channel-code an OFDM received through a wireless channel and transport the same to an upper layer.

Figure 1C:
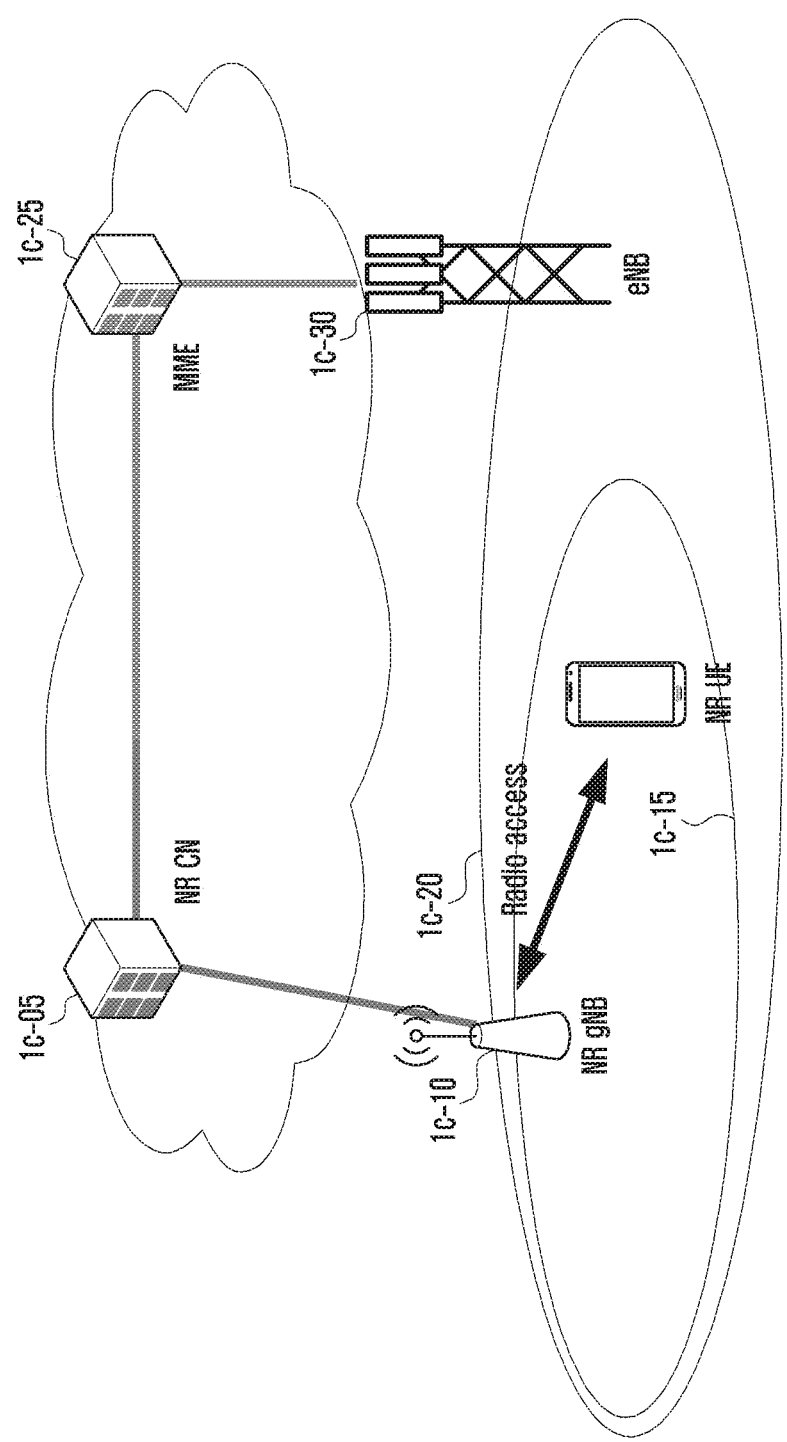
FIG. 1C illustrates a structure of a next-generation mobile communication system to which the disclosure can be applied according to an embodiment of the disclosure.

FIG. 1C illustrates a structure of a next-generation mobile communication system to which the disclosure can be applied according to an embodiment of the disclosure.

Referring to FIG. 1C, as illustrated, a radio access network of a next-generation mobile communication system (hereinafter, "NR" or "5G") includes a new radio node B (hereinafter, "NR gNB" or "NR base station") 1c-10 and a new radio core network (NR CN) 1c-05. A user terminal (a new radio user equipment, hereinafter, "NR UE" or "terminal") 1c-15 is connected to an external network through the NR gNB 1c-10 and the NR CN 1c-05.

In FIG. 1C, the NR gNB 1c-10 corresponds to an evolved node B (ENB) of an existing LTE system. The NR gNB is connected to the UE 1c-15 via a wireless channel, and may provide a better service than an existing node B. In a next-generation mobile communication system, all user traffics are provided through a shared channel. Thus, there is a need for a device for collecting and scheduling state information (such as a buffer state, an available transmission power state, a channel state, etc.) of UEs, and the NR gNB 1c-10 functions as such a device. One NR gNB may normally control multiple cells. In order to realize ultra-high-speed data transmission compared with an existing LTE, NR gNB can have an existing maximum bandwidth or more, and additionally, a beam-forming technique can be applied by using orthogonal frequency division multiplexing (OFDM) as a radio access technology. Further, an adaptive modulation & coding (hereinafter, referred to as "AMC") scheme for determining a modulation scheme and a channel coding rate in accordance with a channel state of a terminal is applied. The NR CN 1c-05 performs functions such as mobility support, bearer configuration, and quality of service (QoS) configuration. The NR NC is a device for performing various types of control functions in addition to a mobility management function for a terminal, and is connected to multiple base stations. Further, the next-generation mobile communication system may interwork with an existing LTE system, and the NR CN is connected to an MME 1c-25 through a network interface. The MME is connected to an ENB 1c-30 which is an existing base station.

Figure 1D:
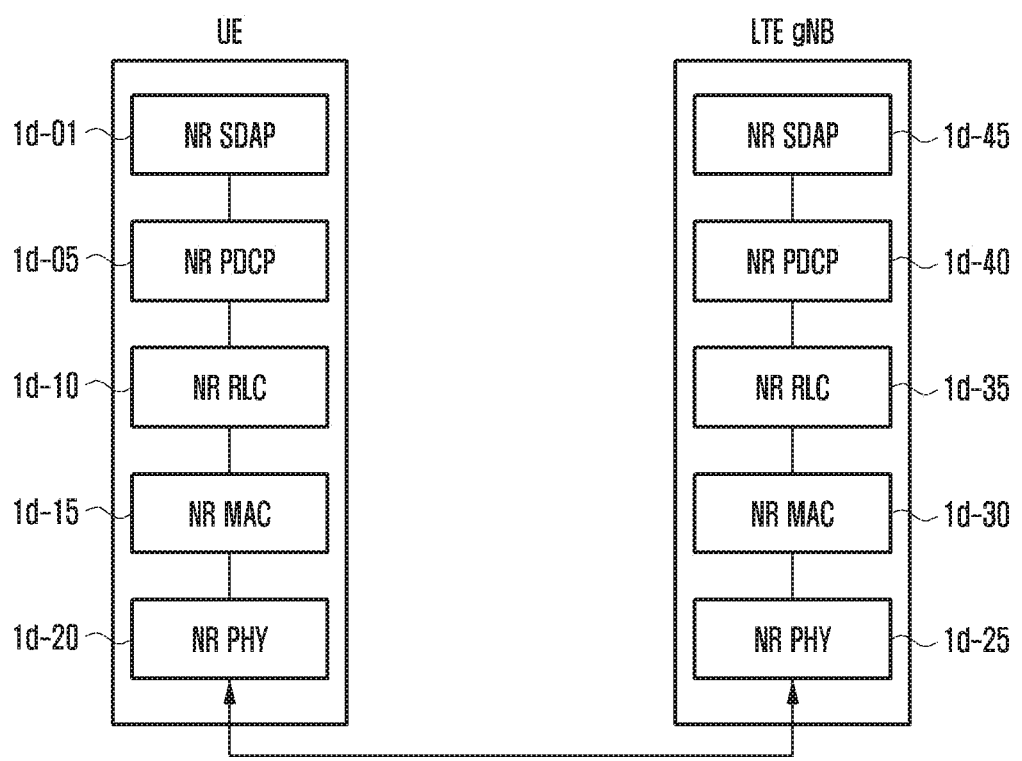
FIG. 1D illustrates a wireless protocol architecture in a next-generation mobile communication system to which the disclosure can be applied according to an embodiment of the disclosure.

FIG. 1D illustrates a wireless protocol architecture in a next-generation mobile communication system to which the disclosure can be applied according to an embodiment of the disclosure.

Referring to FIG. 1D, a wireless protocol of the next-generation mobile communication system includes NR SDAPs 1d-01 and 1d-45, NR PDCPs 1d-05 and 1d-40, NR RLCs 1d-10 and 1d-35, and NR MACs 1d-15 and 1d-30 in a terminal and an NR base station, respectively.

Main functions of the NR SDAPs 1d-01 and 1d-45 may include some of the follow functions.

Transfer of user plane data
 Mapping between a QoS flow and a data radio bearer (DRB) for both DL and UL
 Marking QoS flow ID in both DL and UL packets
 Reflective QoS flow to DRB mapping for the UL SDAP PDUs.

In relation to an SDAP layer device, a terminal is given, through an RRC message, a configuration on whether to use a header of the SDAP layer device for each PDCP layer device, each bearer, or each logical channel or whether to use a function of the SDAP layer device. When an SDAP header is configured, the terminal may be instructed, through an AS QoS reflection configuration 1-bit indicator (AS reflective QoS) and an NAS QoS reflection configuration 1-bit indicator (NAS reflective QoS) of the SDAP header, to update or reconfigure mapping information regarding a data bearer and a QoS flow of each of a downlink and an uplink. The SDAP header may include QoS flow ID information indicating QoS. The QoS information may be used as data processing priority, scheduling information, etc. for supporting a smooth service.

Main functions of the NR PDCPs 1d-05 and 1d-40 may include some of the following functions.

Header compression and decompression: ROHC only
 Transfer of user data
 In-sequence delivery of upper layer PDUs
 Out-of-sequence delivery of upper layer PDUs
 PDCP PDU reordering for reception
 Duplicate detection of lower layer SDUs
 Retransmission of PDCP SDUs
 Ciphering and deciphering
 Timer-based SDU discard in uplink The reordering function of an NR PDCP device among the above functions refers to a function of rearranging PDCP PDUs received in a lower layer in order on the basis of PDCP sequence number (PDCP SN), and may include a function of delivering data to an upper layer in the arranged order or may include a function of immediately delivering without taking the order into consideration, may include a function of recording PDCP PDUs lost by the reordering, may include a function of sending a state report for the lost PDCP PDUs to a sender, and may include a function of requesting retransmission of the lost PDCP PDUs.

Main functions of the NR RLC 1d-10 and 1d-35 may include some of the following functions.

Transfer of upper layer PDUs
 In-sequence delivery of upper layer PDUs
 Out-of-sequence delivery of upper layer PDUs
 Error Correction through ARQ
 Concatenation, segmentation and reassembly of RLC SDUs
 Re-segmentation of RLC data PDUs
 Reordering of RLC data PDUs
 Duplicate detection
 Protocol error detection
 RLC SDU discard
 RLC re-establishment The in-sequence delivery function of the NR RLC device refers to a function of delivering RLC SDUs received from a lower layer to an upper layer in order. When an original RLC SDU is divided into a plurality of RLC SDUs and the RLC SDUs are received, the in-sequence delivery function may include a function of reassembling and delivering received RLC PDUs; rearranging received RLC PDUs based on a RLC SN (sequence number) or a PDCP SN (sequence number), may include a function of recording RLC PDUs lost by the reordering, may include a function of sending a status report for the lost RLC PDUs to a sender, may include requesting retransmission of the lost RLC PDUs, may include a function of delivering, if there is a lost RLC SDU, only RLC SDUs before the lost RLC SDU to the upper layer in order; or may include a function of delivering, when a timer has expired even if there is a lost RLC SDU, all RLC SDUs received before the timer starts or received up to the time to the upper layer in order. Further, it is possible to process the RLC PDUs in the order in which the RLC PDUs are received (in the arrival order regardless of the sequence number order) and deliver the processed RLC PDUs to the PDCP device regardless of the order (out-of-sequence delivery). In the case of segments, it is possible to receive segments, which are stored or are to be received later, reconfigure the same into one integrated RLC PDU, process the one integrated RLC PDU, and deliver the same to the PDCP device. The NR RLC layer may not include a concatenation function. The concatenation function may be performed in an NR MAC layer or may be replaced with a multiplexing function of the NR MAC layer.

The out-of-sequence delivery function of the NR RLC device refers to a function of delivering RLC SDUs received from a lower layer directly to an upper layer regardless of order. When an original one RLC SDU is divided into multiple RLC SDUs and the RLC SDUs are received, the out-of-sequence delivery function may include a function of reassembling and delivering the RLC SDUs, and may include a function storing RLC SN or PDCP SN of the received RLC PDUs and recording RLC PDUs lost by the reordering.

The NR MACs 1d-15 and 1d-30 may be connected to various NR RLC layer devices included in one terminal, and main functions of the NR MACs may include some of the following functions.

Mapping between logical channels and transport channels
 Multiplexing/demultiplexing of MAC SDUs
 Scheduling information reporting
 Error correction through HARQ
 Priority handling between logical channels of one UE
 Priority handling between UEs by means of dynamic scheduling
 MBMS service identification
 Transport format selection
 Padding NR PHY layers 1d-20 and 1d-25 may channel-code and modulate upper layer data into an OFDM symbol and transmit the same through a wireless channel, or may demodulate and channel-decode an OFDM symbol received through a wireless channel and delivery the same to an upper layer.

The bearer in the disclosure may include an SRB and a DRB, the SRB is a signaling radio bearer and the DRB is data radio bearer. An UM DRB is a DRB using an RLC layer device which operates in an unacknowledged mode (UM), and an AM DRB is a DRB using an RLC layer device which operates in an acknowledged mode (AM). An SRB0 is an SRB which has not been ciphered, and is a bearer which is configured in an MCG of a terminal and through which the terminal exchanges an RRC message with a base station. An SRB1 is a ciphered SRB and is a bearer which is configured in an MCG of the terminal and through which the terminal and the base station configure a connection therebetween and exchange an NAS-related RRC message. An SRB2 is a ciphered SRB and is a bearer which is configured in an MCG of the terminal and through which the terminal exchanges an RRC message for a main-connection configuration with the base station. An SRB3 is a ciphered SRB and is a bearer which is configured in an SCG of the terminal and through which the terminal can directly transmit an RRC message to an MCG via an SCG MAC layer device. A split SRB is an SRB through which one PDCP layer device is in an MCG or an SCG, two RLC layer devices are connected to the one PDCP layer device and perform data transmission/reception, one RLC layer device is connected to an MCG MAC layer device, and the other RLC layer device is connected to the SCG MAC layer device.

Figure 1E:
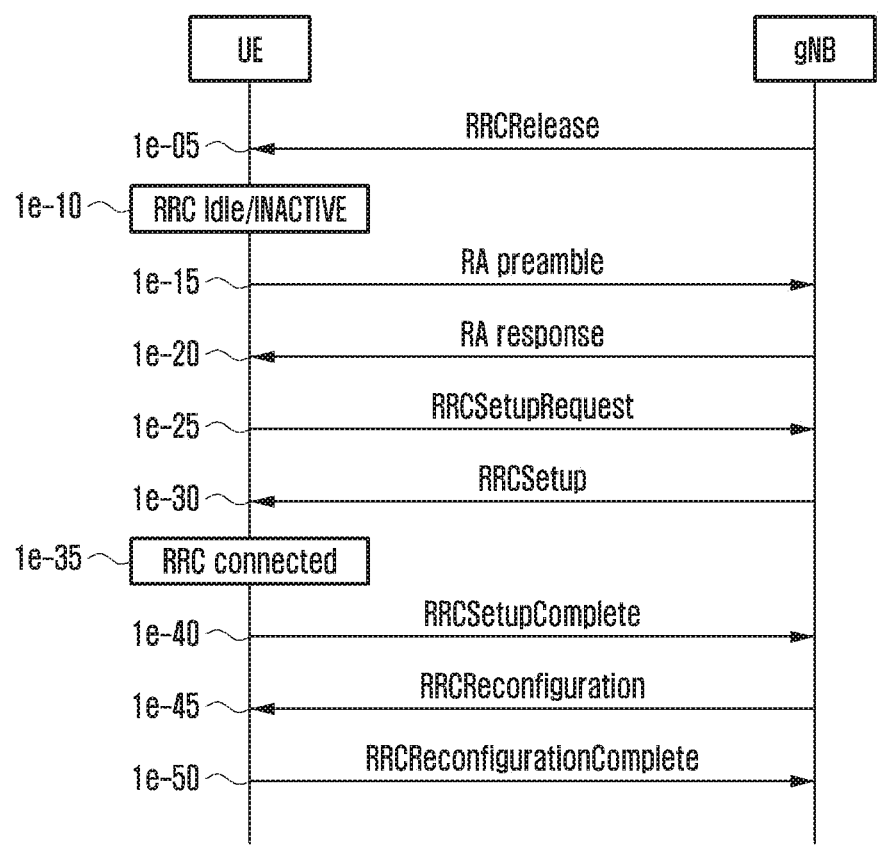
FIG. 1E illustrates procedures in which, in a next-generation mobile communication system of the disclosure, a terminal switches from a radio resource control (RRC) idle mode or an RRC inactive mode to an RRC connected mode, and a base station configures carrier aggregation or dual connectivity for the terminal according to an embodiment of the disclosure.

FIG. 1E illustrates procedures in which, in a next-generation mobile communication system of the disclosure, a terminal switches from an RRC idle mode or an RRC inactive mode to an RRC connected mode, and a base station configures carrier aggregation or dual connectivity for the terminal according to an embodiment of the disclosure.

Referring to FIG. 1E, the base station may switch the terminal, which is in an RRC connected mode and has configured a connection to a network, to an RRC idle mode or an RRC inactive mode for a predetermined reason. The predetermined reason may include the lack of a scheduling resource, the stop of data transmission/reception to/from the terminal for a predetermined time, etc.

The base station may transmit an RRCRelease message to the terminal so as to instruct the terminal to switch to the RRC idle mode or the RRC inactive mode. Through an indicator (suspend-config) included in the RRCRelease message, the base station may instruct the terminal to switch to the RRC inactive mode. When the indicator (suspend-config) is not included in the RRCRelease message, the base station may switch the terminal to the RRC idle mode (operation 1e-05).

When a connection to the network is required for a predetermined reason, the terminal, which has switched to the RRC idle mode or the RRC inactive mode, may transmit a random access preamble in order to perform a random access procedure, may receive a random access response, may request a RRC connection configuration, and may receive an RRC message, and perform the RRC connection configuration (operations 1e-10, 1e-15, 1e-20, 1e-25, 1e-30, 1e-35, and 1e-40).

The terminal may establish backward transmission synchronization with the base station through a random access procedure and may transmits an RRCSetupRequest message or RRCResumeRequest message (in the case of the terminal in the RRC inactive mode) to the base station (operation 1e-25). The RRCSetupRequest message or RRCResumeRequest message (in the case of the terminal in the RRC inactive mode) may include a reason (establishmentCause) to establish a connection with an identifier of the terminal.

The base station may transmit an RRCSetup message or RRCResume message (in the case of the terminal in an RRC inactive mode) such that the terminal configures an RRC connection (operation 1e-30). The RRCSetup message or RRCResume message (in the case of the terminal in an RRC inactive mode) may include at least one among configuration information for each logical channel, configuration information for each bearer, configuration information of a PDCP layer device, configuration information of an RLC layer device, and configuration information of an MAC layer device.

The RRCSetup message or RRCResume message (in the case of the terminal in an RRC inactive mode) may allocate a bearer identifier (e.g. an SRB identifier or a DRB identifier) to each bearer, and may indicate configurations of a PDCP layer device, an RLC layer device, an MAC layer device, a PHY layer device with respect to each bearer.

The terminal, which has configured the RRC connection, may transmit an RRCSetupComplete message or RRCResumeComplete message (in the case of the terminal in an RRC inactive mode) to the base station (operation 1e-40). The RRCSetupComplete message or RRCResumeComplete message (in the case of the terminal in an RRC inactive mode) may include a control message that is called a SERVICE REQUEST in which the terminal makes a request to an AMF or an MME for a bearer configuration for a predetermined service. The base station may transmit, to the AMF or the MME, the SERVICE REQUEST message included in the RRCSetupComplete message or RRCResumeComplete message (in the case of the terminal in an RRC inactive mode). The AMF or the MME may determine whether to provide a service requested by the terminal.

When AMF or the MME has determined to provide the service requested by the terminal, the AMF or the MME may transmit an INITIAL CONTEXT SETUP REQUEST message to the base station. The INITIAL CONTEXT SETUP REQUEST message may include Quality of Service (QoS) information to be applied in a data radio bearer (DRB) configuration and security-related information to be applied to a DBR (e.g. a security key and a security algorithm).

In order to configure security with the terminal, the base station may transmit and receive a SecurityModeCommand message and a SecurityModeComplete message to complete a security configuration. When the security configuration is completed, the base station may transmit a RRCConnectionReconfiguration message to the terminal (operation 1e-45).

The RRCConnectionReconfiguration message may allocate a bearer identifier (e.g. an SRB identifier or a DRB identifier) to each bearer, and may indicate configurations of the PDCP layer device, the RLC layer device, the MAC layer device, and the PHY layer device with respect to each bearer.

Further, the RRCConnectionReconfiguration message may configure additional Scells in order to configure carrier aggregation for the terminal, or may configure additional SCG configuration information in order to configure dual connectivity.

Further, the RRCConnectionReconfiguration message may include configuration information of a DRB through which user data is to be processed. The terminal may configure the DBR by applying the information and may transmit an RRCConnectionReconfigurationComplete message to the base station (operation 1e-50). The base station, which has completed the DRB configuration with the terminal, transmits an INITIAL CONTEXT SETUP COMPLETE message to the AMF or the MME and may complete the connection (operation 1e-50).

When all the procedures described above are completed, the terminal may transmit and receive data to and from the base station through a core network. According to some embodiments, a data transmission procedure may include three steps: an RRC connection configuration; a security configuration; and a DRB configuration. Further, the base station may transmit an RRC Connection Reconfiguration message to the terminal in order to update, add, or change a configuration for a predetermined reason. For example, the base station may perform a configuration for adding, releasing, or changing an Scell in carrier aggregation, and may change or add an SCG configuration in dual connectivity.

The procedure in which the base station configures the carrier aggregation or the dual connectivity for the terminal, as described above, may be summarized as follows. First, when the terminal configures a connection to the base station and the base station configures frequency measurement configuration information with respect to the terminal in the RRC connection mode, the terminal may measure a frequency based on the frequency measurement configuration information and may report the measurement result to the base station. In order to configure carrier aggregation for the terminal, the base station may configure, based on the frequency measurement result reported from the terminal, configuration information regarding additional Scells as an RRC message, and may send an MAC CE to make the Scells active, idle, or inactive. Further, the base station may configure, based on the frequency measurement result reported from the terminal, an additional cell group (secondary cell group) configuration information in order to configure dual connectivity for the terminal.

Figure 1F:
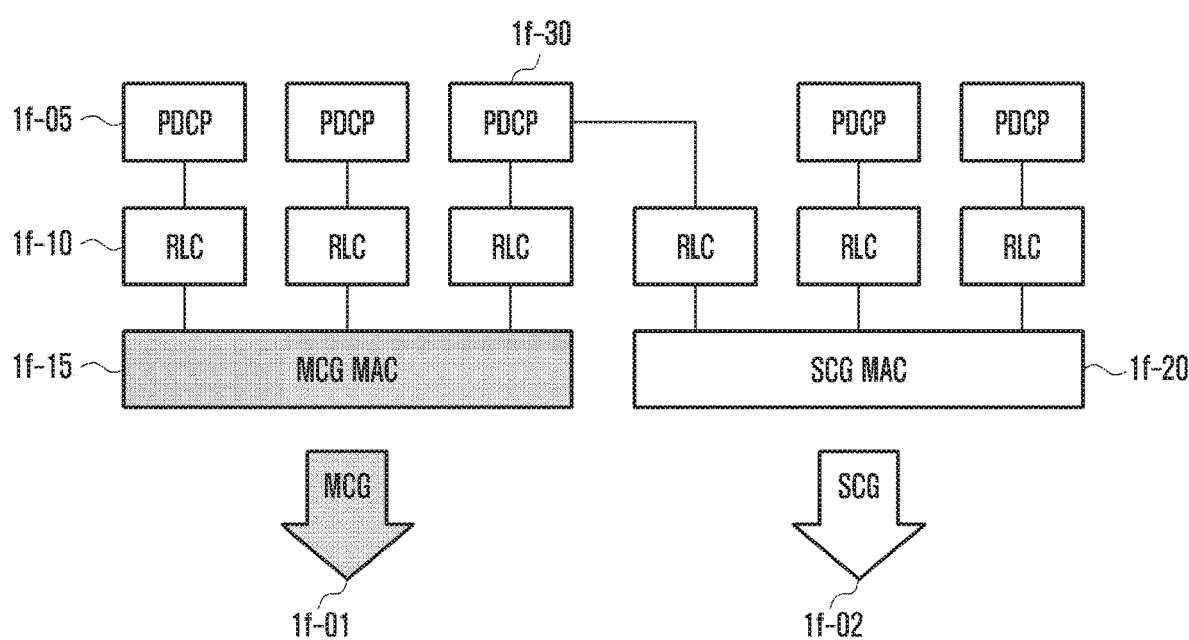
FIG. 1F illustrates a structure of a protocol layer device of a terminal in which dual connectivity has been configured in the disclosure according to an embodiment of the disclosure.

FIG. 1F illustrates an architecture of a protocol layer device of a terminal in which dual connectivity has been configured in the disclosure according to an embodiment of the disclosure.

Referring to FIG. 1F, when a base station configures the SCG configuration information in order to dual connectivity for a terminal, the terminal may establish a PDCP layer device or RLC layer device for an SCG as illustrated in FIG. 1F in consideration of a bearer identifier and a logical identifier which correspond to the SCG. Therefore, in the terminal, an MAC layer device 1*f*-15 for an MCG and an MAC layer device 1*f*-20 for an SCG may be configured, respectively, and RLC layer devices and PDCP layer devices corresponding to each of the MCG and the SCG may be configured. Further, a split SRB or a split DRB may have an architecture in which one PDCP layer device, such as reference numeral 1*f*-30, belongs to the MCG or the SCG and two different RLC layer devices are connected to the MCG MAC layer device and an SCG MAC layer device.

In the case of a base station, a base station corresponding to the MCG may be configured to have the same layer architecture as a protocol layer device architecture for an MCG for the terminal, and a base station corresponding to the SCG may be configured to have the same layer architecture as a protocol layer device architecture for an SCG for the terminal.

In a first embodiment, as illustrated in FIG. 1F, it is taken into considered that a terminal, in which dual connectivity has been configured, maintains a connection to a base station (or cell) in an MCG and fails to make a wireless connection to the base station (or cell) in an SCG.

It may be determined that the radio link failure in the SCG may be determined to be caused due to one of the following reasons.

1. When a timer (e.g. T310) has started in a Pscell by instructing an RRC layer device that a signal synchronization in an SCG physical (PHY) layer device is not matched, and the timer has expired, 2. When an integrity verification failure has occurred in an SRB3, 3. When the RRC layer device is instructed that a random access problem has occurred in an SCG MAC layer device while predetermined timers (e.g. T300, T301, T304, T311, or T319) are not operated, and 4. When the number of retransmissions in an AM RLC layer device connected to the SCG MAC layer device has reached the maximum number of times of retransmission, a packet duplication technology (configured as carrier aggregation or dual connectivity) has not been configured in the RLC layer device, and mapping (allowedServingCell) for transmission/reception to/from a logical channel corresponding to the RLC layer device has been configured only in an Scell.

If, due to one of the reasons as described above, the terminal, in which dual connectivity has been configured, maintains a connection to a base station (or cell) in the MCG but fails to make a wireless connection to the base station (or cell) in the SCG, the following operations of the terminal are proposed such that the terminal can continuously transmit/receive data in the MCG, and can recover the SCG, replace the SCG with another SCG, or release the SCG in which the radio link failure has occurred. Further, when data transmission/reception through the SCG does not stop, if a radio link failure is detected, the terminal may be allowed to perform the following operations.

When the RRC layer device is instructed that a signal synchronization in an SCG physical (PHY) layer device is not matched, a timer (e.g. T310) starts in a Pscell, and the timer expires, When the RRC layer device is instructed that a random access problem has occurred in the SCG MAC layer device while predetermined timers (e.g. T300, T301, T304, T311, or T319) are not operated, When an integrity verification failure has occurred in the SRB3, When the number of retransmissions in the AM RLC layer device connected to the SCG MAC layer device has reached the maximum number of times of retransmission, if mapping (allowedServingCell) for transmission/reception to/from a logical channel corresponding to the RLC layer device has been configured only in an Scell, the terminal does not determine that an SCG radio link failure has occurred, and may transmit failure information to the base station in order to report that the RLC layer device has failed. Specifically, the failure information may include an indicator indicating a cell group (an MCG or an SCG) to which the failed RLC layer device belongs, a logical channel identifier, and a failure type (e.g. reaching the maximum number of times of retransmission). When the failure occurs in the RLC layer device connected to the SCG MAC layer device, if dual connectivity to an LTE base station and an NR base station or to an NR base station and an NR base station is configured in the terminal and an SRB3 (or split SRB) is configured, the terminal may report the failure of the SCG RLC layer device to an MCG base station through the SRB3 (or split SRB). If the dual connectivity is not configured or the SRB3 (or split SRB) is not configured, the terminal may include the failure information in an RRC message in the MCG MAC layer device and may transmit the RRC message to the base station. Further, a measurement result of other frequencies may be in the failure information and transmitted such that the base station can use the measurement result to quickly configure a novel Scell or a novel SCG.

When mapping (allowedServingCell) for transmission/reception to/from a logical channel corresponding to the RLC layer device has not been configured only in an S cell, or in other cases, it is taken into consideration that a radio link failure (a radio link failure (RLF)) has occurred in the SCG.

Further, the terminal may report the SCG radio link failure to the base station. Specifically, since the terminal has detected the SCG radio link failure, the terminal may stop transmission to an SCG base station with respect to all configured SRBs or DRBs. The SCG MAC layer device is initialized. When the timer 304 (which is a timer operated in the case of handover) is operating, the timer 304 may be stopped (because, during the handover, for example, in the case of an SCG change, an SCG radio link failure may be detected). The terminal may indicate the type of SCG radio link failure (e.g. exceeding the maximum number of times of RLC retransmission, an integrity verification failure, or a mismatch of synchronization, or timer expiry), forms an SCG radio link failure message, and may report the SCG radio link failure to an MCG base station through an SRB connected to the MCG MAC layer device. Further, a measurement result of other frequencies may be included in the failure information and be transmitted so as to be usable when the base station quickly configures a novel Scell or a novel SCG.

As proposed above, when the terminal, in which dual connectivity has been configured, maintains a connection to the base station (or cell) in the MCG but fails to make a wireless connection to the base station (or cell) in the SCG, the terminal is configured to: continuously transmit/receive data in the MCG; and report the SCG radio link failure to the MCG base station such that the base station can recover the SCG or can replace the SCG with another SCG, or can release the SCG in which the radio link failure has occurred, thereby enabling continuous data transmission.

When the SCG radio link failure is reported, the MCG base station may recover the SCG of the terminal, may replace the SCG with another SCG, or may transmit configuration information by an RRC message via an SRB (e.g., SRB1 or SRB2) connected to the MCG MAC layer device of the terminal such that the terminal releases the SCG in which the radio link failure has occurred. Specifically, the MCG base station may instruct the terminal to release existing SCG configuration information, may transmit novel SCG configuration information to notify of random access information to be used in an random access procedure such that the terminal is configured to be connected to a novel SCG, or may notify of random access information to be used in an random access procedure such that the terminal attempts to make a reconnection to the existing SCG.

In a second embodiment, as illustrated in FIG. 1F, it is taken into consideration that a terminal, in which dual connectivity has been configured, maintains a connection to a base station (or cell) in an SCG and fails to make a connection to the base station (or cell) in an MCG.

It may be determined that the radio link failure in the MCG may be determined to be caused due to one of the following reasons.

1. When a timer (e.g. T310) has started in a Pcell by instructing an RRC layer device that a signal synchronization in an MCG physical (PHY) layer device is not matched, and the timer has expired, 2. When an integrity verification failure has occurred in an SRB1 or an SRB2, 3. When an RRC layer device is instructed that a random access problem has occurred in an MCG MAC layer device while predetermined timers (e.g. T300, T301, T304, T311, or T319) are not operated, and 4. When the number of retransmissions in an AM RLC layer device connected to the MCG MAC layer device has reached the maximum number of times of retransmission, a packet duplication technology (configured as carrier aggregation or dual connectivity) has not been configured in the RLC layer device, and mapping (allowedServingCell) for transmission/reception to/from a logical channel corresponding to the RLC layer device has been configured only in an Scell.

If, due to one of the reasons as described above, the terminal, in which dual connectivity has been configured, maintains a connection to the base station (or cell) in the SCG but fails to make a connection to the base station (or cell) in the MCG, the following operations of the terminal are proposed such that the terminal can continuously transmit/receive data in the SCG, and can recover the MCG, replace the MCG with another MCG, release the MCG in which the radio link failure has occurred, or can switch the SCG, in which a connection is currently maintained, to an MCG. Further, when data transmission/reception through the MCG does not stop, if a radio link failure is detected, the terminal may be allowed to perform the following operations.

When the RRC layer device is instructed that a signal synchronization in an MCG physical (PHY) layer device is not matched, a timer (e.g. T310) starts in a Pcell, and the timer expires, When the RRC layer device is instructed that a random access problem has occurred in the MCG MAC layer device while predetermined timers (e.g. T300, T301, T304, T311, or T319) are not operated, When an integrity verification failure has occurred in the SRB1 or SRB2, When the number of retransmissions in the AM RLC layer device connected to the MCG MAC layer device has reached the maximum number of times of retransmission, if mapping (allowedServingCell) for transmission/reception to/from a logical channel corresponding to the RLC layer device has been configured only in an Scell, the terminal does not determine that an MCG radio link failure has occurred, and may transmit failure information to the base station in order to report that the RLC layer device has failed. Specifically, the failure information may include an indicator indicating a cell group (an MCG or an SCG) to which the failed RLC layer device belongs, a logical channel identifier, and a failure type (e.g. reaching the maximum number of times of retransmission). When a failure occurs in the RLC layer device connected to the MCG MAC layer device, the terminal may include the failure information in an RRC message in the MCG MAC layer device and may transmit the RRC message to the base station through the SRB1. Further, a measurement result of other frequencies may be included in the failure information and be transmitted so as to be usable when the base station quickly configures a novel Scell or a novel SCG.

When mapping (allowedServingCell) for transmission/reception to/from a logical channel corresponding to the RLC layer device has not been configured only in an S cell, or in other cases, it is taken into consideration that a radio link failure (a radio link failure (RLF)) has occurred in the MCG.

If an AS security configuration is not activated (when a connection failure has occurred during an RRC connection configuration) or if the As security configuration is activated but the SRB2 and at least one DRB are not configured (when a complete RRC connection is not configured), the terminal may switch to an RRC idle mode.

Otherwise, if the terminal is configured with dual connectivity, the SCG does not stop transmission, and data transmission/reception is possible and if the terminal is configured with: a split SRB (e.g. split SRB1) connected to an MCG base station and connected to an MCG MAC layer device (in which a PDCP layer device is in an MCG) and an SCG MAC layer device of the terminal; and an SRB (e.g. SRB3) connected to an SCG base station and connected to an SCG MAC layer device (in which a PDCP layer device is in an SCG), the terminal may perform one of the following methods.

Method 1: The terminal may report an MCG radio link failure to the MCG base station or an SCG base station (When the MCG radio link failure is reported to the SCG base station, the SCG base station may inform the MCG base station of the MCG radio link failure of the terminal). Specifically, since the terminal has detected the MCG radio link failure, the terminal may stop transmission of all SRBs or DRBs configured in the configured MCG to the MCG base station. The MCG MAC layer device is initialized. However, bearers or layer devices configured in the SCG are maintained without being initialized and may continue to perform data transmission/reception. If a timer T304 (which is a timer operated in the case of handover) is operating, the timer T304 may be stopped (because, during the handover, a radio link failure may be detected). The terminal may indicate the type of MCG radio link failure (e.g. exceeding the maximum number of times of RLC retransmission, an integrity verification failure, or a mismatch of synchronization, or timer expiry), forms an MCG radio link failure message, and may report the MCG radio link failure to the MCG base station or the SCG base station through a split SRB (e.g. split SRB1) connected to SCG MAC layer device or through an SRB (e.g. SRB3) connected to the SCG MAC layer device. Further, a measurement result of other frequencies may be included in the failure information and be transmitted so as to be usable when the base station quickly configures a novel cell (e.g. Pcell) or a novel cell group (e.g. MCG). Further, the radio link failure information may indicate causes for the failure. Method 1 is a method in which a terminal indicates MCG failure information such that a base station can recover or change an MCG in which radio link failure is indicated. Method 1 enables a terminal to solve a radio link failure problem based on an MCG base station or an SCG base station.

Method 2: Since the terminal has detected the MCG radio link failure, the terminal may stop transmission of all SRBs or DRBs except for a configured SRB0 to the MCG base station (The SRB0 must transmit an RRC reestablishment message and the transmission of the SRB0 must not stop). The MCG MAC layer device is initialized. However, bearers or layer devices configured in the SCG are maintained without being initialized and may continue to perform data transmission/reception. If a timer T304 (which is a timer operated in the case of handover) is operating, the timer T304 may be stopped (because, during the handover, a radio link failure may be detected). The terminal may trigger an RRC connection reestablishment procedure for the MCG base station. When an RRC connection reestablishment request message is transmitted in the procedure, the terminal may indicate that the MCG radio link failure has occurred. Further, the radio link failure information may indicate causes for the failure. Method 2 enables the terminal to identify MCG failure information and solve an MCG failure problem by itself.

Method 3: Since the terminal has detected the MCG radio link failure, the terminal may stop transmission of all configured SRBs or DRBs to the MCG base station. The MCG MAC layer device is initialized. However, bearers or layer devices configured in the SCG are maintained without being initialized and may continue to perform data transmission/reception. If a timer T304 (which is a timer operated in the case of handover) is operating, the timer T304 may be stopped (because, during the handover, a radio link failure may be detected). The terminal may report an MCG radio link failure to the MCG base station or the SCG base station (When the MCG radio link failure is reported to the SCG base station, the SCG base station may inform the MCG base station of the MCG radio link failure of the terminal). Specifically, the terminal may trigger an RRC connection reestablishment procedure for the MCG base station or the SCG base station. When an RRC connection reestablishment request message is transmitted in the procedure, the terminal may instruct the MCG base station or the SCG base station that the MCG radio link failure has occurred. When an RRC connection reestablishment request message is transmitted in the procedure, the terminal may instruct that the MCG radio link failure has occurred through a split SRB (e.g. split SRB1) connected to the SCG MAC layer device or through a SRB (e.g. SRb3 or SRB0) connected to the SCG MAC layer device. Further, the radio link failure information may indicate causes for the failure. Method 3 is a method in which a terminal indicates MCG failure information through a split SRB1 or SRB3 such that a base station can recover or change an MCG in which a radio link failure is indicated. Method 3 enables a terminal to solve a radio link failure problem based on an MCG base station or an SCG base station.

Method 4: Since the terminal has detected the MCG radio link failure, the terminal may stop transmission of all SRBs or DRBs except for a configured SRB0 to the MCG base station (The SRB0 must transmit an RRC reestablishment message and the transmission of the SRB0 must not stop). The MCG MAC layer device is initialized. However, bearers or layer devices configured in the SCG are maintained without being initialized and may continue to perform data transmission/reception. If a timer T304 (which is a timer operated in the case of handover) is operating, the timer T304 may be stopped (because, during the handover, a radio link failure may be detected). The terminal may report an MCG radio link failure to the MCG base station or the SCG base station (When the MCG radio link failure is reported to the SCG base station, the SCG base station may inform the MCG base station of the MCG radio link failure of the terminal). Specifically, the terminal may trigger an RRC connection reestablishment procedure for the MCG base station or the SCG base station. That is, the terminal may camp on a cell, in which a good signal can be obtained, through a cell reselection procedure and then transmit an RRC connection reestablishment request message through the SRB0, and may use an indicator to instruct the MCG base station or the SCG base station that the MCG radio link failure has occurred. Further, the radio link failure information may indicate causes for the failure. Method 4 is a method in which a terminal indicates MCG failure information through a SRB0 such that a base station can recover or change an MCG in which a radio link failure is indicated. Method 4 enables a terminal to solve a radio link failure problem based on an MCG base station or an SCG base station.

If the terminal is not configured with dual connectivity, the SCG stops transmission, and data transmission/reception is impossible and if the terminal is not configured with an SRB or a split SRB (e.g. split SRB1) connected to an SCG base station, or in other cases, since the terminal has detected the MCG radio link failure, the terminal may stop transmission of all SRBs or DRBs except for a configured SRB0 to the MCG base station (The SRB0 must transmit an RRC reestablishment message and the transmission of the SRB0 must not stop). The MCG MAC layer device is initialized. Further, all bearers (SRBs or DRBs) configured in the SCG are stopped and the SCG MAC layer device is also initialized. The SCG bearers and SCG configuration information are released. If a timer T304 (which is a timer operated in the case of handover) is operating, the timer T304 may be stopped (because, during the handover, a radio link failure may be detected). The terminal may report an MCG radio link failure to the MCG base station or the SCG base station (When the MCG radio link failure is reported to the SCG base station, the SCG base station may inform the MCG base station of the MCG radio link failure of the terminal). Specifically, the terminal may trigger an RRC connection reestablishment procedure for the MCG base station or the SCG base station. That is, the terminal may camp on a cell, in which a good signal can be obtained, through a cell reselection procedure and then transmit an RRC connection reestablishment request message through the SRB0, and may use an indicator to instruct the MCG base station or the SCG base station that the MCG radio link failure has occurred. Further, the radio link failure information may indicate causes for the failure.

As proposed above, when the terminal, in which dual connectivity has been configured, maintains a connection to the base station (or cell) in the SCG but fails to make a wireless connection to the base station (or cell) in the MCG, the terminal is configured to: continuously transmit/receive data in the MCG; and report the MCG radio link failure to the MCG base station or SCG base station such that the base station can recover the MCG, can release the MCG in which the radio link failure has occurred and add a novel cell group to use the same as an MCG, or can use, as MCG, the SCG in which a wireless connection is currently maintained, thereby enabling continuous data transmission.

When the MCG radio link failure is reported, the MCG base station, the SCG base station, or a novel base station (in the case in which, after a cell reselection, an RRC connection reestablishment procedure has been performed using the novel base station) may recover the MCG of the terminal, may release the MCG in which the radio link failure has occurred and add a novel cell group to be used as an MCG, or may transmit configuration information by an RRC message through a split SRB (e.g. split SRB1 or split SRB2) connected to the SCG MAC layer device of the terminal or an SRB (e.g. SRB3) connected to the SCG MAC layer device or through an SRB0 connected to the MCG MAC layer device such that the terminal can use, as MCG, the SCG in which a wireless connection is currently maintained. Specifically, the base station may instruct the terminal to release existing MCG configuration information, may transmit novel cell group configuration information and inform random access information to be used in an random access procedure so as to instruct the terminal to configure a connection to the novel cell group and use the novel cell group as an MCG, or may inform the random access information to be used in the random access procedure such that the terminal attempts to make a reconnection to the existing MCG. In another method, the base station may include, in an RRC message, information instructing the terminal to regard SCG configuration information previously configured for the terminal as an MCG, and may transmit the RRC message through a split SRB (e.g. split SRB1 or split SRB2) connected to the MCG MAC layer device of the terminal or an SRB (e.g. SRB3) connected to the SCG MAC layer device or through an SRB0 connected to the MCG MAC layer device. Therefore, a cell, which has been a Pscell, may be regarded as a Pcell, and when the role of an existing SCG changes to the role of an MCG in its role, the base station may perform configuration such that another cell group is added as an SCG, thereby reconfiguring dual connectivity.

Figure 1G:
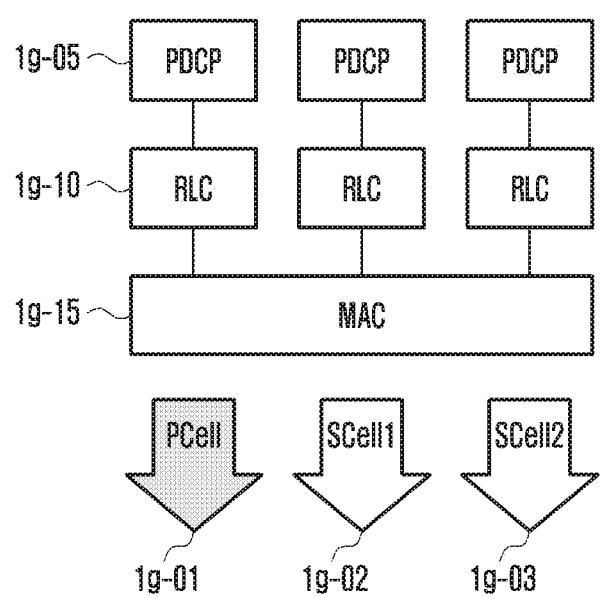
FIG. 1G illustrates an architecture of a protocol layer device of a terminal in which carrier aggregation is configured in the disclosure according to an embodiment of the disclosure.

FIG. 1G illustrates an architecture of a protocol layer device of a terminal in which carrier aggregation is configured in the disclosure according to an embodiment of the disclosure.

Referring to FIG. 1G, when a base station configures Scell configuration information, bearer configuration information, and protocol layer device configuration information in order to configure carrier aggregation for a terminal as described with reference to FIG. 1E, the terminal may establish a PDCP layer device, an RLC layer device, or an MAC layer device. Therefore, the terminal may configure a MAC layer device 1g-15 for a Pcell 1g-01 and multiple Scells 1g-02 and 1g-03. The MAC layer device may divide multiple RLC layer devices connected to the MAC layer device by a logical channel identifier, may multiplex various types of data received from the multiple RLC layer devices and form the multiplexed data as one type of data, and may transmit the one type of data to the Pcell or Scell. For the base station, the same architecture as the protocol architecture of the terminal may be configured.

A third embodiment considers the case in which a terminal, in which carrier aggregation has been configured, maintains a connection to a base station (or cell) and fails to make a wireless connection to the base station (or cell) in a Pcell.

The radio link failure in the Pcell may be determined to be caused due to one of the following reasons.

1. When a timer (e.g. T310) has started in a Pcell by instructing an RRC layer device that a signal synchronization in an MCG physical (PHY) layer device is not matched, and the timer has expired, 2. When an integrity verification failure has occurred in an SRB1 or an SRB2, 3. When the RRC layer device is instructed that a random access problem has occurred in an MCG MAC layer device while predetermined timers (e.g. T300, T301, T304, T311, or T319) are not operated, and 4. When the number of retransmissions in an AM RLC layer device connected to the MCG MAC layer device has reached the maximum number of times of retransmission, a packet duplication technology (configured as carrier aggregation or dual connectivity) has not been configured in the RLC layer device, and mapping (allowedServingCell) for transmission/reception to/from a logical channel corresponding to the RLC layer device has been configured only in an Scell.

If, due to one of the reasons as described above, the terminal, in which carrier aggregation has been configured, maintains a connection to a base station (or cell) in the Scell but fails to make a wireless connection to the base station (or cell) in the Pcell, the following specific operations of the terminal are proposed such that the terminal can continuously transmit/receive data in the Scell and can recover the Pcell, replace the Pcell with another Pcell, release the Pcell in which the radio link failure has occurred, or switch, to a Pcell, the Scell in which a connection is currently maintained. Further, when data transmission/reception through the SCG does not stop, if a radio link failure is detected, the terminal may be allowed to perform the following operations. In order to report or indicate a radio link failure in a Pcell through an Scell proposed in the disclosure, an Scell satisfying multiple conditions among the following conditions must be configured in the terminal. That is, only with respect to an Scell satisfying multiple conditions among the following conditions, a radio link failure in a Pcell is allowed to be reported.

First condition: An Scell must be configured as a separate timing advance group (sTAG) distinguished from a Pcell. The reason therefor is that when the Scell is configured as a Pcell timing advance group (pTAG), since a Pcell radio link failure has occurred, a radio link failure may also occur in the Scell referring to the Pcell.

Second condition: In an Scell, both an uplink and a downlink must be configured. The reason therefor is that in order to report a Pcell radio link failure, the uplink must be configured and additional configuration information must be received through the downlink.

Third condition: In an Scell, a PUCCH must be configured. The PUCCH must be configured in order to report a Pcell radio link failure, receive an additional configuration information message and then indicate HARQ ACK/NACK information, or report PHR.

Fourth condition: An Scell must be activated. The reason therefor is that data transmission/reception can be performed through an uplink and a downlink only when the Scell is activated.

Fifth condition: An activated bandwidth part (BWP) must be configured in an Scell. Further, there may have to be an SSB in the activated BWP in order to match signal synchronization.

Sixth condition: As in FIG. 1E of the disclosure, when a base station configures cell configuration information by an RRC message, the base station may indicate, using an indicator, specific Scells in which an MCG (or Pcell) or SCG (or Pscell) connection failure can be reported when a connection failure occurs in an MCG (or a Pcell) or SCG (or a Pscell).

The third embodiment proposes a specific terminal operation in which, when a terminal, in which carrier aggregation has been configured, maintains a wireless connection to a base station (or cell) in an Scell but fails to make a connection to the base station (or cell) in a Pcell, the terminal continues to transmit/receive data in the Scell and reports a Pcell radio link failure to a specific Scell such that the Pcell can be recovered or replaced with another Pcell, the Pcell in which the radio link failure has occurred can be released, or the Scell in which a connection is currently maintained can be switched to a Pcell.

When a timer (e.g. T310) has started in a Pcell by instructing an RRC layer device that a signal synchronization in an MCG physical (PHY) layer device is not matched, and the timer has expired, When the RRC layer device is instructed that a random access problem has occurred in an MCG MAC layer device while predetermined timers (e.g. T300, T301, T304, T311, or T319) are not operated, When an integrity verification failure has occurred in an SRB1 or an SRB2, and When the number of retransmissions in an AM RLC layer device connected to the MCG MAC layer device has reached the maximum number of times of retransmission, if mapping (allowedServingCell) for transmission/reception to/from a logical channel corresponding to the RLC layer device has been configured only in an Scell, the terminal does not determine that an MCG radio link failure has occurred, and may transmit failure information to the base station in order to report that the RLC layer device has failed. Specifically, the failure information may include an indicator indicating a cell group (an MCG or an SCG) to which the failed RLC layer device belongs, a logical channel identifier, and a failure type (e.g. reaching the maximum number of times of retransmission). When a failure occurs in the RLC layer device connected to the MCG MAC layer device, the terminal may include the failure information in an RRC message in the MCG MAC layer device and may transmit the RRC message to the base station through the SRB1. Further, a measurement result of other frequencies may be included in the failure information and be transmitted so as to be usable when the base station quickly configures a novel Scell or a novel SCG.

When mapping (allowedServingCell) for transmission/ reception to/from a logical channel corresponding to the RLC layer device has not been configured only in an Scell, or in other cases, it is taken into consideration that a radio link failure (a radio link failure (RLF)) has occurred in the MCG.

If an AS security configuration is not activated (when a connection failure has occurred during an RRC connection configuration) or if the As security configuration is activated but the SRB2 and at least one DRB are not configured (when a complete RRC connection is not configured), the terminal may switch to an RRC idle mode.

Otherwise,
  if carrier aggregation is configured in the terminal and there is an Scell configured to satisfy the first condition, the second condition, the third condition, the fourth condition, the fifth condition, or the sixth condition among configured Scells,
    the terminal may report a Pcell radio link failure through the Scell. Specifically, the terminal may form an RRC message for Pcell radio link failure information, may configure the information as data in the MCG MAC layer device through a bearer SRB1 or SRB2, i.e., through a logical channel identifier corresponding to the SRB1 or the SRB2, and may transmit the Pcell radio link failure information to the base station via the Scell satisfying the multiple conditions.
  If carrier aggregation is not configured in the terminal and there is no Scell configured to satisfy the first condition, the second condition, the third condition, the fourth condition, the fifth condition, or the sixth condition among configured Scells,
    if the terminal is configured with dual connectivity, the SCG does not stop transmission, and data transmission/reception is possible and if the terminal is configured with: a split SRB (e.g. split SRB1) connected to an MCG base station and connected to an MCG MAC layer device (in which a PDCP layer device is an MCG) and an SCG MAC layer device of the terminal; or an SRB (e.g. SRB3) connected to an SCG base station and connected to an SCG MAC layer device (in which a PDCP layer device is in an SCG), the terminal may perform one of the following methods.
    Method 1: The terminal may report an MCG radio link failure to the MCG base station or an SCG base station (When the MCG radio link failure is reported to the SCG base station, the SCG base station may inform the MCG base station of the MCG radio link failure of the terminal). Specifically, since the terminal has detected the MCG radio link failure, the terminal may stop transmission of all SRBs or DRBs configured in the configured MCG to the MCG base station. The MCG MAC layer device is initialized. However, bearers or layer devices configured in the SCG are maintained without being initialized and may continue to perform data transmission/reception. If a timer T304 (which is a timer operated in the case of handover) is operating, the timer T304 may be stopped (because, during the handover, a radio link failure may be detected). The terminal may indicate the type of MCG radio link failure (e.g. exceeding the maximum number of times of RLC retransmission, an integrity verification failure, or a mismatch of synchronization, or timer expiry), forms an MCG radio link failure message, and may report the MCG radio link failure to the MCG base station or the SCG base station through a split SRB (e.g. split SRB1) connected to SCG MAC layer device or through an SRB (e.g. SRB3) connected to the SCG MAC layer device. Further, a measurement result of other frequencies may be included in the failure information and be transmitted so as to be usable when the base station quickly configures a novel cell (e.g. Pcell) or a novel cell group (e.g. MCG). Further, the radio link failure information may indicate causes for the failure. Method 1 is a method in which a terminal indicates MCG failure information such that a base station can recover or change an MCG in which radio link failure is indicated. Method 1 enables a terminal to solve a radio link failure problem based on an MCG base station or an SCG base station.

Method 2: Since the terminal has detected the MCG radio link failure, the terminal may stop transmission of all SRBs or DRBs except for a configured SRB0 to the MCG base station (The SRB0 must transmit an RRC reestablishment message and the transmission of the SRB0 must not stop). The MCG MAC layer device is initialized. However, bearers or layer devices configured in the SCG are maintained without being initialized and may continue to perform data transmission/reception. If a timer T304 (which is a timer operated in the case of handover) is operating, the timer T304 may be stopped (because, during the handover, a radio link failure may be detected). The terminal may trigger an RRC connection reestablishment procedure for the MCG base station. When an RRC connection reestablishment request message is transmitted in the procedure, the terminal may indicate that the MCG radio link failure has occurred. Further, the radio link failure information may indicate causes for the failure. Method 2 enables the terminal to identify MCG failure information and solve an MCG failure problem by itself.

Method 3: Since the terminal has detected the MCG radio link failure, the terminal may stop transmission of all configured SRBs or DRBs to the MCG base station. The MCG MAC layer device is initialized. However, bearers or layer devices configured in the SCG are maintained without being initialized and may continue to perform data transmission/reception. If a timer T304 (which is a timer operated in the case of handover) is operating, the timer T304 may be stopped (because, during the handover, a radio link failure may be detected). The terminal may report an MCG radio link failure to the MCG base station or the SCG base station (When the MCG radio link failure is reported to the SCG base station, the SCG base station may inform the MCG base station of the MCG radio link failure of the terminal). Specifically, the terminal may trigger an RRC connection reestablishment procedure for the MCG base station or the SCG base station. When an RRC connection reestablishment request message is transmitted in the procedure, the terminal may instruct the MCG base station or the SCG base station that the MCG radio link failure has occurred. When an RRC connection reestablishment request message is transmitted in the procedure, the terminal may instruct that the MCG radio link failure has occurred through a split SRB (e.g. split SRB1) connected to the SCG MAC layer device or through a SRB (e.g. SRB3 or SRB0) connected to the SCG MAC layer device. Further, the radio link failure information may indicate causes for the failure. Method 3 is a method in which a terminal indicates MCG failure information through a split SRB1 or SRB3 such that a base station can recover or change an MCG in which a radio link failure is indicated. Method 3 enables a terminal to solve a radio link failure problem based on an MCG base station or an SCG base station.

Method 4: Since the terminal has detected the MCG radio link failure, the terminal may stop transmission of all SRBs or DRBs except for a configured SRB0 to the MCG base station (The SRB0 must transmit an RRC reestablishment message and the transmission of the SRB0 must not stop). The MCG MAC layer device is initialized. However, bearers or layer devices configured in the SCG are maintained without being initialized and may continue to perform data transmission/reception. If a timer T304 (which is a timer operated in the case of handover) is operating, the timer T304 may be stopped (because, during the handover, a radio link failure may be detected). The terminal may report an MCG radio link failure to the MCG base station or the SCG base station (When the MCG radio link failure is reported to the SCG base station, the SCG base station may inform the MCG base station of the MCG radio link failure of the terminal). Specifically, the terminal may trigger an RRC connection reestablishment procedure for the MCG base station or the SCG base station. That is, the terminal may camp on a cell, in which a good signal can be obtained, through a cell reselection procedure and then transmit an RRC connection reestablishment request message through the SRB0, and may use an indicator to instruct the MCG base station or the SCG base station that the MCG radio link failure has occurred. Further, the radio link failure information may indicate causes for the failure. Method 4 is a method in which a terminal indicates MCG failure information through a SRB0 such that a base station can recover or change an MCG in which a radio link failure is indicated. Method 4 enables a terminal to solve a radio link failure problem based on an MCG base station or an SCG base station.

If the terminal is not configured with dual connectivity, the SCG stops transmission, and data transmission/reception is impossible and if the terminal is not configured with an SRB or a split SRB (e.g. split SRB1) connected to an SCG base station, or in other cases, since the terminal has detected the MCG radio link failure, the terminal may stop transmission of all SRBs or DRBs except for a configured SRB0 to the MCG base station (The SRB0 must transmit an RRC reestablishment message and the transmission of the SRB0 must not stop). The MCG MAC layer device is initialized. Further, all bearers (SRBs or DRBs) configured in the SCG are stopped and the SCG MAC layer device is also initialized. The SCG bearers and SCG configuration information are released. If a timer T304 (which is a timer operated in the case of handover) is operating, the timer T304 may be stopped (because, during the handover, a radio link failure may be detected). The terminal may report an MCG radio link failure to the MCG base station or the SCG base station (When the MCG radio link failure is reported to the SCG base station, the SCG base station may inform the MCG base station of the MCG radio link failure of the terminal). Specifically, the terminal may trigger an RRC connection reestablishment procedure for the MCG base station or the SCG base station. That is, the terminal may camp on a cell, in which a good signal can be obtained, through a cell reselection procedure and may then transmit an RRC connection reestablishment request message through the SRB0, and may use an indicator to instruct the MCG base station or the SCG base station that the MCG radio link failure has occurred. Further, the radio link failure information may indicate causes for the failure.

As proposed above, when the terminal, in which carrier aggregation has been configured, maintains a connection to the base station (or cell) in the Scell but fails to make a wireless connection to the base station (or cell) in the Pcell, the terminal is configured to: continuously transmit/receive data in the Scell; and report the Pcell radio link failure to the MCG base station through the Scell satisfying the multiple conditions among Scells such that the base station can recover the Pcell, can release the Pcell in which the radio link failure has occurred and add a novel cell to use the same as a Pcell, or can use, as a Pcell, the Scell satisfying the multiple conditions among Scells in which a wireless connection is currently maintained, thereby enabling continuous data transmission.

When the Pcell radio link failure is reported, the MCG base station may recover of the Pcell of the terminal, may release the Pcell in which the radio link failure has occurred and add a novel cell to be used as a Pcell, or may transmit configuration information to the base station by an RRC message through the Scell satisfying the multiple conditions such that the terminal can use, as a Pcell, the Scell satisfying the multiple conditions among Scells in which a wireless connection is currently maintained. Specifically, the base station may instruct the terminal to release existing Pcell configuration information, may transmit new cell configuration information and inform random access information to be used in an random access procedure so as to instruct the terminal to configure a connection to the new cell and use the new cell as a Pcell, or may inform the random access information to be used in the random access procedure such that the terminal attempts to make a reconnection to the existing Pcell. In another method, the base station may include, in an RRC message, information instructing the terminal to regard Scell configuration information previously configured for the terminal as a Pcell, and may transmit the RRC message through the Scell which satisfies the multiple conditions and is connected to the MCG MAC layer device of the terminal. Therefore, a cell, which has been an Scell, may be regarded as a Pcell, and when the role of an existing Scell changes to the role of a Pcell, the base station may perform configuration such that another cell is added as an Scell, thereby reconfiguring carrier aggregation.

The above embodiments may also be extended and applied to the case where both carrier aggregation and dual connectivity are configured.

In the disclosure, at the time of reporting an MCG radio link failure (or a Pcell radio link failure), if both a split SRB (e.g. SRB1) and an SRB (e.g. SRB3) connected to the SCG base station are configured, the terminal may report the MCG radio link failure through the split SRB. The reason is that when the radio link failure is reported through the SRB connected to the SCG base station, the SCG base station must re-capsulate received data and transport the same to an MCG, and thus processing delay may occur.

The fourth embodiment proposes a specific terminal operation in which, when a terminal, in which carrier aggregation has been configured, maintains a connection to a base station (or cell) in an Scell or an SCG but fails to make a connection to the base station (or cell) in a Pcell (or an MCG), the terminal continues to transmit/receive data in the Scell or the SCG and reports a Pcell radio link failure to a specific Scell such that the Pcell can be recovered or replaced with another Pcell, the Pcell in which the radio link failure has occurred can be released, or the Scell in which a connection is currently maintained can be switched to a Pcell. Further, the fourth embodiment proposes a terminal operation which may be considered in the case in which an MCG radio link failure (or Pcell connection failure) reporting procedure fails at the time of MCG radio link failure (or Pcell connection failure) reporting. Specifically, when an MCG radio link failure (or Pcell connection failure) has occurred, if the MCG radio link failure is reported through an Scell of an MCG, satisfying the first condition, the second condition, the third condition, the fourth condition, the fifth condition, or the sixth condition of the disclosure, the terminal may define and trigger a first timer. The first timer may be configured using an RRC message, and a timer value may also be configured in the RRC message. When the MCG radio link failure reporting is triggered or transmitted, the terminal may start the first timer. If the terminal does not receive an RRC message, such as an RRC message for instructing handover so as to recover the MCG radio link failure, an RRC message for reestablishing an RRC connection, or an RRC message for disconnecting an MCG, until the first timer expires, the terminal may determine that an MCG radio link failure reporting procedure has failed, and may trigger an RRC connection reestablishment procedure to reestablish an MCG wireless connection (In this case, connection configuration information regarding an Scell or an SCG may be released). In the RRC connection reestablishment procedure, the terminal may attempt to make a wireless connection to a suitable Scell selected through a cell reselection procedure, but may directly perform the RRC connection reestablishment procedure with respect to a cell supported by an SCG base station in which a valid connection is configured. In another method, when the MCG radio link failure reporting procedure to the Scell has failed, the terminal may also trigger again the MCG radio link failure reporting procedure to an SCG provided that dual connectivity is configured and the SCG wireless connection is valid. When an SCG radio link failure is detected during the operation of the first timer, the terminal may perform an SCG radio link failure reporting procedure without directly triggering the RRC connection reestablishment procedure.

Further, when an MCG radio link failure (or Pcell connection failure) has occurred, if dual connectivity is configured and an SCG wireless connection is valid (e.g. when there is no MCG Scell satisfying the conditions or MCG radio link failure reporting to an Scell has been performed but has failed, or when, in the absence of the MCG Scell, dual connectivity is configured and an SCG is valid), the terminal may report the MCG radio link failure through the SCG, and may define and trigger a second timer. The second timer may be configured using an RRC message, and a timer value may also be configured in the RRC message. When the MCG radio link failure reporting is triggered or transmitted, the terminal may start the first timer. If the terminal does not receive an RRC message, such as an RRC message for instructing handover so as to recover the MCG radio link failure, an RRC message for reestablishing an RRC connection, or an RRC message for disconnecting an MCG, until the second timer expires, the terminal may determine that an MCG radio link failure reporting procedure has failed, and may trigger an RRC connection reestablishment procedure to reestablish an MCG wireless connection (In this case, connection configuration information regarding an Scell or an SCG may be released). When an SCG radio link failure is detected during the operation of the second timer, the terminal may directly trigger the RRC connection reestablishment procedure to reestablish an MCG wireless connection. In the RRC connection reestablishment procedure, the terminal may attempt to make a wireless connection to a suitable Scell selected through a cell reselection procedure, but may directly perform the RRC connection reestablishment procedure with respect to a cell supported by an SCG base station in which a valid connection is configured in order to prevent a connection delay due to the cell reselection.

The same timer or an existing defined timer may be the first timer and the second timer. Separate timers may be defined and used, respectively.

The specific operation proposed in the fourth embodiment is as follows.
- When a timer (e.g. T310) has started in a Pcell by instructing an RRC layer device that a signal synchronization in an MCG physical (PHY) layer device is not matched, and the timer has expired,
- When the RRC layer device is instructed that a random access problem has occurred in an MCG MAC layer device while predetermined timers (e.g. T300, T301, T304, T311, or T319) are not operated,
- When an integrity verification failure has occurred in an SRB1 or an SRB2, and
- When the number of retransmissions in an AM RLC layer device connected to the MCG MAC layer device has reached the maximum number of times of retransmission, if mapping (allowedServingCell) for transmission/reception to/from a logical channel corresponding to the RLC layer device has been configured only in an Scell, the terminal does not determine that an MCG radio link failure has occurred, and may transmit failure information to the base station in order to report that the RLC layer device has failed. Specifically, the failure information may include an indicator indicating a cell group (an MCG or an SCG) to which the failed RLC layer device belongs, a logical channel identifier, and a failure type (e.g. reaching the maximum number of times of retransmission). When a failure occurs in the RLC layer device connected to the MCG MAC layer device, the terminal may include the failure information in an RRC message in the MCG MAC layer device and may transmit the RRC message to the base station through the SRB1. Further, a measurement result of other frequencies may be included in the failure information and be transmitted so as to be usable when the base station quickly configures a new Scell or a new SCG.

When mapping (allowedServingCell) for transmission/reception to/from a logical channel corresponding to the RLC layer device has not been configured only in an Scell, or in other cases, it is taken into consideration that a radio link failure (a radio link failure (RLF)) has occurred in the MCG.

If an AS security configuration is not activated (when a connection failure has occurred during an RRC connection configuration) or if the As security configuration is activated but the SRB2 and at least one DRB are not configured (when a complete RRC connection is not configured), the terminal may switch to an RRC idle mode.

Otherwise, if carrier aggregation is configured in the terminal and there is an Scell configured to satisfy the first condition, the second condition, the third condition, the fourth condition, the fifth condition, or the sixth condition among configured Scells, and if MCG radio link failure reporting is first triggered in the Scell, the terminal may report a Pcell radio link failure through the Scell. Specifically, the terminal may form an RRC message for Pcell radio link failure information, may configure the information as data in the MCG MAC layer device through a bearer SRB1 or SRB2, i.e., through a logical channel identifier corresponding to the SRB1 or the SRB2, and may transmit the Pcell radio link failure information to the base station via the Scell satisfying the multiple conditions.

Further, a first timer may be started. (As described above, in a procedure for responding to an MCG radio link failure reporting message, the terminal may stop or initialize the first timer when receiving, as a response, an RRC message for instructing handover such that the base station can recover the MCG radio link failure, an RRC message for reestablishing an RRC connection, or an RRC message for disconnecting an MCG.)

If carrier aggregation is not configured in the terminal and there is no Scell configured to satisfy the first condition, the second condition, the third condition, the fourth condition, the fifth condition, or the sixth condition among configured Scells, or/and if MCG radio link failure reporting has been triggered in an Scell and the MCG radio link failure reporting procedure has failed in the Scell or a first timer has expired, if the terminal is configured with dual connectivity, the S3CG does not stop transmission, and data transmission/reception is possible and if the terminal is configured with: a split SRB (e.g. split SRB1) connected to an MCG base station and connected to an MCG MAC layer device (in which a PDCP layer device is an MCG) and an SCG MAC layer device of the terminal; or an SRB (e.g. SRB3) connected to an SCG base station and connected to an SCG MAC layer device (in which a PDCP layer device is in an SCG), the terminal may perform one of the following methods.

Method 1: The terminal may report an MCG radio link failure to the MCG base station or an SCG base station (When the MCG radio link failure is reported to the SCG base station, the SCG base station may inform the MCG base station of the MCG radio link failure of the terminal). Specifically, since the terminal has detected the MCG radio link failure, the terminal may stop transmission of all SRBs or DRBs configured in the configured MCG to the MCG base station. The MCG MAC layer device is initialized. However, bearers or layer devices configured in the SCG are maintained without being initialized and may continue to perform data transmission/reception. If a timer T304 (which is a timer operated in the case of handover) is operating, the timer T304 may be stopped (because, during the handover, a radio link failure may be detected). The terminal may indicate the type of MCG radio link failure (e.g. exceeding the maximum number of times of RLC retransmission, an integrity verification failure, or a mismatch of synchronization, or timer expiry), forms an MCG radio link failure message, and may report the MCG radio link failure to the MCG base station or the SCG base station through a split SRB (e.g. split SRB1) connected to SCG MAC layer device or through an SRB (e.g. SRB3) connected to the SCG MAC layer device. Further, a measurement result of other frequencies may be included in the failure information and be transmitted so as to be usable when the base station quickly configures a new cell (e.g. Pcell) or a new cell group (e.g. MCG). Further, the radio link failure information may indicate causes for the failure. Method 1 is a method in which a terminal indicates MCG failure information such that a base station can recover or change an MCG in which radio link failure is indicated. Method 1 enables a terminal to solve a radio link failure problem based on an MCG base station or an SCG base station. Further, a second timer may be started. (As described above, in a procedure for responding to an MCG radio link failure reporting message, the terminal may stop or initialize the second timer when receiving, as a response, an RRC message for instructing handover such that the base station can recover the MCG radio link failure, an RRC message for reestablishing an RRC connection, or an RRC message for disconnecting an MCG.)

Method 2: Since the terminal has detected the MCG radio link failure, the terminal may stop transmission of all SRBs or DRBs except for a configured SRB0 to the MCG base station (The SRB0 must transmit an RRC reestablishment message and the transmission of the SRB0 must not stop). The MCG MAC layer device is initialized. However, bearers or layer devices configured in the SCG are maintained without being initialized and may continue to perform data transmission/reception. If a timer T304 (which is a timer operated in the case of handover) is operating, the timer T304 may be stopped (because, during the handover, a radio link failure may be detected). The terminal may trigger an RRC connection reestablishment procedure for the MCG base station, a suitable Scell selected through a cell reselection procedure, or a cell supported by the SCG base station in which a valid connection is configured. When an RRC connection reestablishment request message is transmitted in the procedure, the terminal may indicate that the MCG radio link failure has occurred. Further, the radio link failure information may indicate causes for the failure. Method 2 enables the terminal to identify MCG failure information and solve an MCG failure problem by itself.

Method 3: Since the terminal has detected the MCG radio link failure, the terminal may stop transmission of all configured SRBs or DRBs to the MCG base station. The MCG MAC layer device is initialized. However, bearers or layer devices configured in the SCG are maintained without being initialized and may continue to perform data transmission/reception. If a timer T304 (which is a timer operated in the case of handover) is operating, the timer T304 may be stopped (because, during the handover, a radio link failure may be detected). The terminal may report an MCG radio link failure to the MCG base station or the SCG base station (When the MCG radio link failure is reported to the SCG base station, the SCG base station may inform the MCG base station of the MCG radio link failure of the terminal). Specifically, the terminal may trigger an RRC connection reestablishment procedure for the MCG base station or the SCG base station. When an RRC connection reestablishment request message is transmitted in the procedure, the terminal may instruct the MCG base station or the SCG base station that the MCG radio link failure has occurred. When an RRC connection reestablishment request message is transmitted in the procedure, the terminal may instruct that the MCG radio link failure has occurred through a split SRB (e.g. split SRB1) connected to the SCG MAC layer device or through a SRB (e.g. SRb3 or SRB0) connected to the SCG MAC layer device. Further, the radio link failure information may indicate causes for the failure. Method 3 is a method in which a terminal indicates MCG failure information through a split SRB1 or SRB3 such that a base station can recover or change an MCG in which a radio link failure is indicated. Method 3 enables a terminal to solve a radio link failure problem based on an MCG base station or an SCG base station. Further, a second timer may be started. (As described above, in a procedure for responding to an MCG radio link failure reporting message, the terminal may stop or initialize the second timer when receiving, as a response, an RRC message for instructing handover such that the base station can recover the MCG radio link failure, an RRC message for reestablishing an RRC connection, or an RRC message for disconnecting an MCG.)

Method 4: Since the terminal has detected the MCG radio link failure, the terminal may stop transmission of all SRBs or DRBs except for a configured SRB0 to the MCG base station (The SRB0 must transmit an RRC reestablishment message and the transmission of the SRB0 must not stop). The MCG MAC layer device is initialized. However, bearers or layer devices configured in the SCG are maintained without being initialized and may continue to perform data transmission/reception. If a timer T304 (which is a timer operated in the case of handover) is operating, the timer T304 may be stopped (because, during the handover, a radio link failure may be detected). The terminal may report an MCG radio link failure to the MCG base station or the SCG base station (When the MCG radio link failure is reported to the SCG base station, the SCG base station may inform the MCG base station of the MCG radio link failure of the terminal). Specifically, the terminal may trigger an RRC connection reestablishment procedure for the MCG base station or the SCG base station. That is, after camping on a cell, in which a good signal can be obtained, selected through a cell reselection procedure or on a cell supported by an SCG in which a connection is valid, the terminal may transmit an RRC connection reestablishment request message through the SRB0. Further, the terminal may use an indicator to instruct the MCG base station or the SCG base station that the MCG radio link failure has occurred. Further, the radio link failure information may indicate causes for the failure. Method 4 is a method in which a terminal indicates MCG failure information through a SRB0 such that a base station can recover or change an MCG in which a radio link failure is indicated. Method 4 enables a terminal to solve a radio link failure problem based on an MCG base station or an SCG base station.

If the terminal is not configured with dual connectivity, the SCG stops transmission, and data transmission/reception is impossible and if the terminal is not configured with an SRB or a split SRB (e.g. split SRB1) connected to an SCG base station, if the first timer or the second timer has expired, or in other cases, Since the terminal has detected the MCG radio link failure, the terminal may stop transmission of all SRBs or DRBs except for a configured SRB0 to the MCG base station (The SRB0 must transmit an RRC reestablishment message and the transmission of the SRB0 must not stop). The MCG MAC layer device is initialized. Further, all bearers (SRBs or DRBs) configured in the SCG are stopped and an SCG MAC layer device is also initialized. The SCG bearers and SCG configuration information are released. If a timer T304 (which is a timer operated in the case of handover) is operating, the timer T304 may be stopped (because, during the handover, a radio link failure may be detected). The terminal may report an MCG radio link failure to the MCG base station or the SCG base station (When the MCG radio link failure is reported to the SCG base station, the SCG base station may inform the MCG base station of the MCG radio link failure of the terminal). Specifically, the terminal may trigger an RRC connection reestablishment procedure for the MCG base station or the SCG base station. That is, after camping on the MCG base station, a cell, in which a good signal can be obtained, selected through a cell reselection procedure, or a cell supported by the SCG base station in which a valid connection is configured, the terminal may transmit an RRC connection reestablishment request message through the SRB0. Further, the terminal may use an indicator to instruct the MCG base station or the SCG base station that the MCG radio link failure has occurred. Further, the radio link failure information may indicate causes for the failure.

As proposed above, when the terminal, in which carrier aggregation has been configured, maintains a connection to the base station (or cell) in the Scell but fails to make a wireless connection to the base station (or cell) in the Pcell, the terminal is configured to: continuously transmit/receive data in the Scell; and report the Pcell radio link failure to the MCG base station through the Scell satisfying the multiple conditions among Scells such that the base station can recover the Pcell, can release the Pcell in which the radio link failure has occurred and add a new cell to use the same as a Pcell, or can use, as a Pcell, the Scell satisfying the multiple conditions among Scells in which a wireless connection is currently maintained, thereby enabling continuous data transmission.

When the Pcell radio link failure is reported, the MCG base station may recover the Pcell of the terminal, may release the Pcell in which the radio link failure has occurred and add a new cell to be used as a Pcell, or may transmit configuration information to the base station by an RRC message through the Scell satisfying the multiple conditions such that the terminal can use, as a Pcell, the Scell satisfying the multiple conditions among Scells in which a wireless connection is currently maintained. Specifically, the base station may instruct the terminal to release existing Pcell configuration information, may transmit new cell configuration information and inform random access information to be used in an random access procedure so as to instruct the terminal to configure a connection to the new cell and use the new cell as a Pcell, or may inform the random access information to be used in the random access procedure such that the terminal attempts to make a reconnection to the existing Pcell. In another method, the base station may include, in an RRC message, information instructing the terminal to regard Scell configuration information previously configured for the terminal as a Pcell, and may transmit the RRC message through the Scell which satisfies the multiple conditions and is connected to the MCG MAC layer device of the terminal. Therefore, a cell, which has been an Scell, may be regarded as a Pcell (for example, may be configured to be regarded as a Pcell by configuring a cell identifier of an existing configured Scell to be zero). When the role of an existing Scell changes to the role of a Pcell, the base station may perform configuration such that another cell is added as an Scell, thereby reconfiguring carrier aggregation.

When the Pcell radio link failure is reported, the MCG base station may recover of the MCG of the terminal, may release the MCG in which the radio link failure has occurred and add a new cell to be used as an MCG, or may transmit configuration information to the base station by an RRC message through the SCG such that the terminal can use, as an MCG, the SCG in which a wireless connection is currently maintained. Specifically, the base station may instruct the terminal to release existing MCG configuration information, may transmit new cell configuration information and inform random access information to be used in an random access procedure so as to instruct the terminal to configure a connection to the new cell and use the new cell as an MCG, or may inform the random access information to be used in the random access procedure such that the terminal attempts to make a reconnection to the existing MCG. In another method, the base station may include, in an RRC message, information instructing the terminal to regard SCG configuration information previously configured for the terminal as an MCG, and may transmit the RRC message through an SRB connected to the MCG or SCG MAC layer device of the terminal. Therefore, a cell, which has been an SCG, may be regarded as a Pcell (for example, may be configured to be regarded as an MCG by configuring a cell identifier of an existing configured SCG to be zero). When the role of an existing SCG changes to the role of an MCG, the base station may perform configuration such that another cell is added as an SCG, thereby reconfiguring carrier aggregation.

In another method, an SCG base station may transmit an RRC connection reestablishment message to a terminal so as to instruct the terminal to recover a wireless connection in an SCG. Therefore, a wireless connection is not recovered in such a manner that the terminal triggers an RRC reestablishment procedure, transmits an RRC reestablishment request message to the base station, receives an RRC reestablishment message from the base station, and transmits an RRC reestablishment completion message to the base station. However, a wireless connection may be recovered in such a manner that, when the base station (e.g. SCG) identifies an MCG radio link failure, the base station (e.g. SCG) triggers an RRC reestablishment procedure and transmits an RRC reestablishment message to the terminal, and the terminal identifies this message and transmits an RRC reestablishment completion message to the base station. The base station (e.g. SCG) informs a base station (e.g. MCG), to which the terminal fails to make a wireless connection, that the terminal has reestablished a connection to the base station (e.g. SCG), so as to allow the base station (e.g. MCG) to release the context of the terminal.

Further, in the MCG radio link failure reporting method of the disclosure, if the terminal report an MCG radio link failure through a split SRB1 configured in an MCG MAC layer device and an SCG MAC layer device, when a packet duplication function is not configured, by changing a configuration from a first RLC layer device (primary RLC entity) to a second RLC layer device (secondary RLC entity) and from the second RLC layer device (secondary RLC entity) to the first RLC layer device (primary RLC entity), an MCG radio link failure reporting message transmitted by the terminal can be transmitted, and PDCP control data (PDCP control PDU) generated or triggered in a PDCP layer device can be transmitted through a split SRB1 connected to the SCG MAC layer device so as to allow the base station to successfully receive the MCG radio link failure reporting message or the PDCP control data. The reason why the configuration change is required is that the terminal may transmit data to the second RLC layer device when packet duplication is configured in the split SRB1, but may not transmit data (MCG radio link failure reporting or PDCP control data) to the second RLC layer device when packet duplication is not configured. In another method, radio link failure reporting or PDCP control data may be allowed to be transmitted to the second RLC layer device only when an MCG radio link failure reporting procedure is triggered. If a configuration is changed from the first RLC layer device to the second RLC layer device with respect to the split SRB1, the changed configuration may be allowed to return to an original configuration when a response to an MCG failure reporting recovery is received, or may be maintained until an RRC message to instruct a return to an original configuration is received.

The above embodiments may also be extended and applied to the case where both carrier aggregation and dual connectivity are configured.

The split SRB (e.g. split SRB1) described in the disclosure may be characterized by having: one PDCP layer device for an MCG in terminal implementation; a structure in which the one PDCP layer device is connected to one RLC layer device for an MCG and one RLC layer device for an SCG; and a structure in which the one RLC layer device for the MCG is connected to an MAC layer device and a PHY layer device for an MCG, and the one RLC layer device for the SCG is connected to an MAC layer device and a PHY layer device for an SCG. A base station is characterized by having: one PDCP layer device in an MCG base station; a structure in which one RLC layer device for an SCG is connected to the one PDCP layer device in an SCG base station connected to an one RLC layer device for an MCG through an X interface (e.g. X2, Xn, etc.) or an S interface (e.g. S1, Sn, etc.); and a structure in which the one RLC layer device for the MCG is connected to an MAC layer device and a PHY layer device of the MCG base station, and the one RLC layer device for the SCG is connected to an MAC layer device and a PHY layer device of the SCG base station.

Further, the SRB3 described in the disclosure may be characterized by having: one PDCP layer device for an SCG in terminal implementation; a structure in which the one PDCP layer device is connected to one RLC layer device for an SCG; and a structure in which the one RLC layer device for the SCG is connected to an MAC layer device and a PHY layer device for an SCG. Further, a base station is characterized by having: one PDCP layer device in an SCG base station; a structure in which one RLC layer device for an SCG is connected to the one PDCP layer device; and a structure in which one RLC layer device for the MCG is connected to an MAC layer device and a PHY layer device of an MCG base station; and a structure in which the one RLC layer device for the SCG is connected to an MAC layer device and a PHY layer device of the SCG base station.

In the second embodiment or the fourth embodiment, after an MCG radio link failure occurs and is reported to the base station through an Scell or an SCG, if a radio link failure occurs in the Scell or SCG, through which the radio link failure reporting has been performed, before the first timer or the second timer expires or a response to the MCG radio link failure reporting is received, the terminal may determine that all the wireless connections has failed, and may trigger a RRC connection reestablishment procedure.

In the second embodiment, when the MCG radio link failure is determined, the terminal may perform bearer stop (e.g. data transmission/reception stop or data processing stop in an SDAP, PDCP, RLC, or MAC layer device of each bearer) with respect to bears other than an SRB0 among bearers configured for an MCG. Since a connection to the MCG is configured again, the terminal may not perform MAC initialization. However, with respect to bearers for an SCG, the terminal may continuously perform data transmission/reception and data processing.

In the second embodiment and the fourth embodiment, when the MCG radio link failure is determined, the terminal may perform the MCG radio link failure reporting procedure through an Scell of an MCG satisfying a predetermined condition. Specifically, the terminal may perform bearer stop (e.g. data transmission/reception stop or data processing stop in an SDAP, PDCP, RLC, or MAC layer device of each bearer) with respect to bears other than an SRB0 or an SRB1 among bearers configured for an MCG. Since a connection to the MCG is configured again, the terminal may not perform MAC initialization. However, when dual connectivity is configured, the terminal may continuously perform data transmission/reception and data processing with respect to bearers for an SCG. In relation to the MAC layer device, initialization is not performed, but a partial initialization (partial MAC reset) procedure may be performed. That is, in the fourth embodiment, if the terminal is configured with carrier aggregation and an Scell satisfying a predetermined condition is configured, when a radio link failure is detected, the RRC layer device of the terminal may indicate the partial MAC reset such that the terminal can transmit an MCG radio link failure reporting message from an MCG MAC layer device to the Scell. The partial MAC reset may initialize processing information of data transmitted/received while maintaining an existing configuration of the MAC layer device and may be triggered by an MAC layer device preparatory work for new transmission or MCG radio link failure reporting. Even when the radio link failure is detected, the partial MAC reset allows the MCG radio link failure reporting message to be transmitted to the MCG MAC layer device.

The partial MAC reset may include one or multiple procedures among the following procedures.

If an upper layer device (e.g. an RRC layer device) instructs a partial MAC reset of an MAC layer device, the MAC layer device may perform one or multiple procedures among the following procedures. In another method, with an Scell satisfying the predetermined condition, the MAC layer device may perform one or multiple procedures among the following procedures.

A procedure of configuring NDI values of all uplink transmission HARQ processes as zero in order to initialize information regarding data previously transmitted/received.

A procedure of flushing all uplink transmission HARQ buffers in order to initialize information regarding data previously transmitted/received.

A procedure of stopping all DRX uplink retransmission timers which are operating.

A procedure of stopping all uplink HARQ RTT timers which are operating

A procedure of stopping a random access procedure which is being performed.

A procedure of discarding information on a random access preamble indicated in detail or random access transmission resource information.

A procedure of initializing a message 3 buffer.

Release a temporary C-RNTI which has been temporarily configured.

In the fourth embodiment, when a terminal detects an MCG radio link failure, is configured with an Scell satisfying a predetermined condition, is configured with dual connectivity, and maintains a valid connection to an SCG, and when the terminal is configured with a split SRB (e.g. split SRB1), the terminal may report the MCG radio link failure using the split SRB. Specifically, the terminal may generate an MCG radio link failure reporting message, and may transmit the MCG radio link failure reporting message from in an MCG MAC layer device to the Scell satisfying the predetermined condition through an RLC layer device which processes data in a PDCP layer device of an MCG corresponding to the split SRB1 and is connected to the MCG MAC layer device. Further, the terminal may generate the MCG radio link failure reporting message, and may transmit the MCG radio link failure reporting message from an SCG MAC layer device to a Pcell or an Scell through an RLC layer device which processes data in a PDCP layer device of an MCG corresponding to the split SRB1 and is connected to the SCG MAC layer device. In another method, the terminal may generate the MCG radio link failure reporting message, and may transmit the MCG radio link failure reporting message from the MCG MAC layer device to the Scell satisfying the predetermined condition through an RLC layer device which processes data in a PDCP layer device of an MCG corresponding to the split SRB1 and is connected to the MCG MAC layer device in order to data-duplicate the MCG radio link failure reporting message and duplicatedly transmit the same. Further, the terminal may transmit the MCG radio link failure reporting message from the SCG MAC layer device to a Pscell or Scell through an RLC layer device connected to the SCG MAC layer device. That is, if the terminal is configured with carrier aggregation, is configured with an Scell satisfying a predetermined condition, and is configured with dual connectivity, and a wireless connection to an SCG Pscell or SCG Scell is made with a predetermined signal strength or greater, the terminal may generate an MCG radio link failure reporting message, apply packet duplication thereto to pack-duplicate the MCG radio link failure reporting message in the MCG PDCP layer device, duplicatedly transmit the duplicated message from the MCG MAC layer device to the Scell through an MCG RLC layer device by using the split SRB, Further, the terminal may duplicatedly transmit the MCG radio link failure reporting message from the SCG MAC layer device to a Pscell or Scell through an SCG RLC layer device. Therefore, the MCG radio link failure reporting message can be transmitted with low transmission delay and high reliability.

Figure 1H:
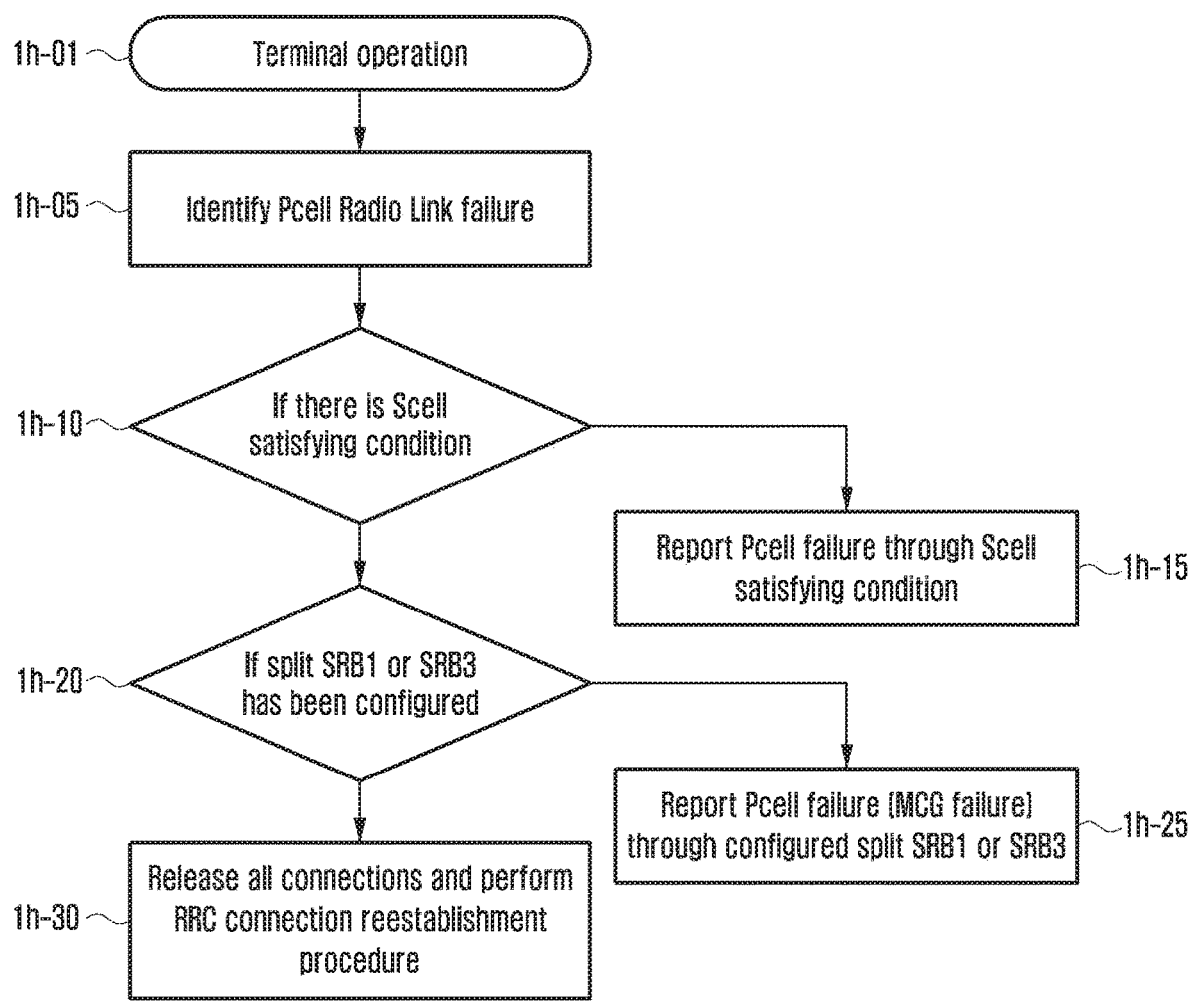
FIG. 1H illustrates an operation of a terminal in embodiments according to an embodiment of the disclosure.

FIG. 1H illustrates an operation of a terminal in embodiments according to an embodiment of the disclosure.

Referring to FIG. 1H, specifically, in the embodiments, when a terminal, in which carrier aggregation or dual connectivity has been configured, fails to make a connection to a base station (or cell) in a Pcell, the terminal continues to transmit/receive data in an Scell or an SCG and reports a Pcell radio link failure (an MCG radio link failure) to a specific Scell or SCG such that the Pcell or MCG can be recovered or replaced with another Pcell or MCG, the Pcell or MCG in which the radio link failure has occurred can be released, or the Scell or SCG in which a connection is currently maintained can be switched to a Pcell or an MCG.

In the terminal, a radio link failure (MCG radio link failure) with the base station (or cell) may occur or be detected in a Pcell (operation 1h-05).

If the terminal is configured with carrier aggregation and is configured with an Scell satisfying the first condition, the second condition, the third condition, the fourth condition, the fifth condition, or the sixth condition among configured Scells (operation 1h-10), the terminal may report a Pcell radio link failure through the Scell. Specifically, the terminal may generate an RRC message for Pcell radio link failure information, may configure the information as data through a bearer SRB1 or SRB2, i.e. through a logical channel identifier corresponding to the SRB1 or SRB2, and may transmit the Pcell radio link failure information to the base station through the Scell satisfying the multiple conditions (operation 1h-15).

If the terminal is not configured with carrier aggregation or is not configured with an Scell satisfying the first condition, the second condition, the third condition, the fourth condition, the fifth condition, or the sixth condition among configured Scells, if the terminal is configured with dual connectivity, an SCG does not stop transmission, and data transmission/reception is possible, and if the terminal is configured with: a split SRB (e.g. split SRB1) connected to an MCG base station and an MCG MAC layer device (in which a PDCP layer device is in an MCG) and an SCG MAC layer device of the terminal; or an SRB (e.g. SRB3) connected to an SCG base station and connected to the SCG MAC layer device (in which a PDCP layer device is in an SCG) (operation 1h-20), the terminal may report MCG radio link failure to the MCG base station or the SCG base station (when the MCG radio link failure is reported to the SCG base station, the SCG base station may inform the MCG base station of the MCG radio link failure of the terminal.) (operation 1h-25).

If the terminal is not configured with dual connectivity, the SCG stops transmission, and data transmission/reception is impossible and if the terminal is not configured with an SRB or a split SRB (e.g. split SRB1) connected to the SCG base station, or in other cases (operation 1h-30), since the terminal has detected the MCG radio link failure, the terminal may stop transmission of all SRBs or DRBs except for a configured SRB0 to the MCG base station (The SRB0 must transmit an RRC reestablishment message and the transmission of the SRB0 must not stop). The MCG MAC layer device is initialized. Further, all bearers (SRBs or DRBs) configured in the SCG are stopped and the SCG MAC layer device is also initialized. The SCG bearers and SCG configuration information are released. If a timer T304 (which is a timer operated in the case of handover) is operating, the timer T304 may be stopped (because, during the handover, a radio link failure may be detected). The terminal may report an MCG radio link failure to the MCG base station or the SCG base station (when the MCG radio link failure is reported to the SCG base station, the SCG base station may inform the MCG base station of the MCG radio link failure of the terminal). Specifically, the terminal may trigger an RRC connection reestablishment procedure for the MCG base station or the SCG base station. That is, after camping on a cell, in which a good signal can be obtained, selected through a cell reselection procedure, the terminal may transmit an RRC connection reestablishment request message through the SRB0. Further, the terminal may use an indicator to instruct the MCG base station or the SCG base station that the MCG radio link failure has occurred. Further, the radio link failure information may indicate causes for the failure.

In a terminal, in which dual connectivity and carrier aggregation have been configured, when a connection failure occurs in a Pscell of an SCG, the embodiments described above may extend to a procedure of reporting a Pscell connection failure to an SCG base station. That is, the embodiments proposed above consider a Pscell connection failure in an SCG instead of a Pscell connection failure in an MCG, and may extend to reporting the Pscell connection failure in the SCG through an Scell of the SCG instead of reporting the Pscell connection failure in the MCG through an Scell of the MCG.

The embodiments described above propose methods for reporting an MCG radio link failure to a base station when the MCG radio link failure is detected. If a base station receives the MCG radio link failure reporting message, the base station may instruct a terminal to recover the MCG radio link failure using one of the following methods.

Method 1: If a terminal, in which carrier aggregation has been configured, maintains a connection to a base station (or cell) in an Scell but fails to make a wireless connection to the base station (or cell) in a Pcell, the terminal may continuously transmit/receive data in the Scell and the base station may recover the Pcell, may release the Pcell in which the radio link failure has occurred and add a new cell to be used as a Pcell, or may give a configuration to the terminal by an RRC message such that the terminal can use, as a Pcell, an Scell satisfying the multiple conditions among Scells in which a wireless connection is currently maintained. That is, when an MCG (or Pcell) radio link failure is reported, the MCG base station may recover the Pcell of the terminal, may release the Pcell in which the radio link failure has occurred and add a new cell to be used as a Pcell, or may transmit configuration information to the base station by an RRC message through the Scell satisfying the multiple conditions such that the terminal can use, as a Pcell, the Scell satisfying the multiple conditions among Scells in which a wireless connection is currently maintained. Specifically, the base station may instruct the terminal to release existing Pcell configuration information, may transmit new cell configuration information and inform random access information to be used in an random access procedure so as to instruct the terminal to configure a connection to the new cell and use the new cell as a Pcell, or may inform the random access information to be used in the random access procedure such that the terminal attempts to make a reconnection to the existing Pcell. In another method, the base station may include, in an RRC message, information instructing the terminal to regard Scell configuration information previously configured for the terminal as a Pcell, and transmit the RRC message through the Scell which satisfies the multiple conditions and is connected to the MCG MAC layer device of the terminal. Therefore, a cell, which has been an Scell, may be regarded as a Pcell (for example, may be configured to be regarded as a Pcell by configuring a cell identifier of an existing configured Scell to be zero). When the role of an existing Scell changes to the role of a Pcell, the base station may perform configuration such that another cell is added as an Scell, thereby reconfiguring carrier aggregation.

Method 2: When the Pcell radio link failure is reported, the MCG base station may recover of the MCG of the terminal, may release the MCG in which the radio link failure has occurred and add a new cell to be used as an MCG, or may transmit configuration information to the base station by an RRC message through the SCG such that the terminal can use, as an MCG, the SCG in which a wireless connection is currently maintained. Specifically, the base station may instruct the terminal to release existing MCG configuration information, may transmit new cell configuration information and inform random access information to be used in an random access procedure so as to instruct the terminal to configure a connection to the new cell and use the new cell as an MCG, or may inform the random access information to be used in the random access procedure such that the terminal attempts to make a reconnection to the existing MCG. In another method, the base station may include, in an RRC message, information instructing the terminal to regard SCG configuration information previously configured for the terminal as an MCG, and may transmit the RRC message through an SRB connected to the MCG or SCG MAC layer device of the terminal. Therefore, a cell, which has been an SCG, may be regarded as a Pcell (for example, may be configured to be regarded as an MCG by configuring a cell identifier of an existing configured SCG to be zero). When the role of an existing SCG changes to the role of an MCG, the base station may perform configuration such that another cell is added as an SCG, thereby reconfiguring carrier aggregation.

Method 3: In another method, an SCG base station may transmit an RRC connection reestablishment message to a terminal so as to instruct the terminal to recover a wireless connection in an SCG. Therefore, a wireless connection is not recovered in such a manner that the terminal triggers an RRC reestablishment procedure, transmits an RRC reestablishment request message to the base station, receives an RRC reestablishment message, and transmits an RRC reestablishment completion message to the base station. However, a wireless connection may be recovered in such a manner that, when the base station (e.g. SCG) identifies an MCG radio link failure, the base station (e.g. SCG) triggers an RRC reestablishment procedure and transmits an RRC reestablishment message to the terminal, and the terminal identifies this message and transmits an RRC reestablishment completion message to the base station. The base station (e.g. SCG) informs a base station (e.g. MCG), to which the terminal fails to make a wireless connection, that the terminal has reestablished a connection to the base station (e.g. SCG), so as to allow the base station (e.g. MCG) to release the context of the terminal.

When the methods proposed above are applied, the terminal may initialize configuration information regarding the SCG base station, may receive a new configuration from the base station, and may receive dual connectivity. In another method, when the methods proposed above are applied, the terminal maintains the configuration information regarding the SCG base station but may initialize the MAC layer device and reestablish the RLC layer device and the PDCP layer device. In another method, the terminal may apply the methods proposed above so as to continuously maintain data transmission/reception to/from the SCG base station.

In order to prevent data transmission/reception failure when method 1, method 2, or method 3 proposed above is applied, a terminal may continuously maintain data transmission/reception with a SCG base station or the terminal may receive a handover instruction from a base station and perform handover to an MCG base station while maintaining data transmission/reception with the SCG base station when dual connectivity is configured for the terminal. Hereinafter, the disclosure presents problems which may occur in this case, and proposes a method for solving the problems.

First, when, in order to recover an MCG radio link failure, the base station instructs the terminal to be handed over to a new cell or base station or instructs the terminal, in which dual connectivity has been configured, to continuously perform data transmission/reception to/from an SCG and to be handed over the MCG, the terminal must receive a new security key regarding an MCG base station and must induce and apply the new security key so as to perform encoding and decoding or integrity protection and integrity verification procedures in a PDCP layer device. Further, when the security key value of the MCG base station is changed, a security key value of the SCG base station corresponding thereto must be newly induced and updated. Therefore, when an MCG security key value is changed due to the handover or recovery of the MCG while data transmission/reception to/from the SCG is maintained, the security key value is changed while the SCG and the terminal transmit/receive data. Therefore, the terminal and the base station may not distinguish between data to which encoding and integrity protection are applied using an old security key and data to which encoding and integrity protection are applied using a new security key.

Therefore, the disclosure proposes methods in which to terminal and a base station can distinguish whether an old security key is applied to each type of data in a PDCP layer device or whether a new security key is applied to each type of data in the PDCP layer device.

Method 1: When a security key is changed while data transmission/reception is performed as described above, a base station may instruct initialization of an MAC layer device (MAC reset), reestablishment of an RLC layer device, or reestablishment of a PDCP layer device so that the PDCP layer device can distinguish between data to an old security key has been applied (e.g. PDCP PDU or PDCP SDU) and data to which a new security key has been applied.

Method 2: When a security key is changed while data transmission/reception is performed as described above, a new PDCP control PDU may be defined and used in order to indicate the same. The new PDCP control PDU may be used as an end indicator (end marker), and may be configured to indicate data (PDCP PDU or PDCP SDU) up to which an old security key value has applied, including a last PDCP serial number or COUNT value to which the old security key value has been applied, and data from which a new security key value has started to be applied. In another method, the new PDCP control PDU may be used as a first indicator (first marker) and may be configured to indicate data (PDCP PDU or PDCP SDU) from which a new security key value has started to be applied, including a first PDCP serial number or COUNT value to which the new security key value has been applied, and data up to which an old security key value has been applied. The PDCP control PDU proposed above may be transmitted for each bearer when a security key value is changed.

Method 3: When a security key is changed while data transmission/reception is performed as described above, a 1-bit indicator is defined in a PDCP header of a PDCP layer device in order to indicate the same, and may be used to indicate which of an old security value or a new security key value has been applied to data corresponding to the PDCP header. When the PDCP control PDU proposed in Method 2 is transmitted each bearer by a change of a security key value, the PDCP control PDU may not be lost in an RLC AM mode, but may be lost in an RLC UM mode. Further, since an NR RLC layer device delivers data to the PDCP layer device by an out-of-sequence delivery method, a decoding failure may occur in a reception PDCP layer device when the PDCP control PDU arrives late. On the other hand, the 1-bit indicator of the PDCP header proposed in Method 3 can indicate which of an older security key value or a new security key value has been applied to each type of data. Therefore, even when the NR RLC layer device performs out-of-sequence delivery and data is lost, the reception PDCP layer device can more efficiently process unlost data. When the 1-bit indicator of the PDCP header determines successful delivery of first data to which a new security key has been applied and last data to which an old security key has been applied from a lower layer (RLC ACK) or from a received PDCP status report, the 1-bit indicator of the PDCP header may not be configured any more. In another method, when the handover of the MCG is completed, the one-bit indicator may not be configured. In another method, the 1-bit indicator may be configured or released according to the instruction of an RRC message or a handover command message. In another method, the 1-bit indicator employing a toggle method may be used. That is, whenever a security key value is changed, the 1-bit indicator may perform indication by toggling from 0 to 1 or from 1 to 0. In another method, the reception PDCP layer device (the base station or the terminal) identifies the 1-bit indicator of the PDCP header and may use the 1-bit indicator until the reception PDCP layer device transmit, to a transmission PDCP layer device (the terminal or the base station), feedback indicating that a new security key and an old security key can be distinguished normally. A new PDCP control PDU may be defined and used for the feedback.

The disclosure has proposed methods for: when MCG (or Pcell) radio link failure is detected, reporting the MCG (or Pcell) radio link failure through an Scell of an MCG when carrier aggregation is configured; and reporting the MCG (or Pcell) radio link failure through an SCG (e.g. SRB3 or split SRB1) when dual connectivity is configured.

Hereinafter, the disclosure proposes different conditions under which the methods proposed by the disclosure can be performed, and a specific fifth embodiment will be described as follows.

The following description is made of a (5-1)th embodiment in which the first embodiment, the second embodiment, the third embodiment, or the fourth embodiment proposed in the disclosure is performed under different conditions. The (5-1)th embodiment is characterized in that when an MCG (or Pcell) radio link failure is detected, if both dual connectivity and carrier aggregation have been configured in a terminal, the dual connectivity is first used to report the MCG (or Pcell) radio link failure. Further, (5-1)th embodiment is characterized in that when both an SRB3 and a split SRB1 have been configured in the dual connectivity, the MCG (or Pcell) radio link failure is reported through the SRB3. The reason is that when a connection to an SCG base station operates normally, it may be determined that a connection to an SCG has higher reliability than a connection to an Scell of an MCG, and it may be determined that the SRB3 connected to the SCG has higher reliability than the split SRB1. When the SRB3 has not been configured, the MCG (or Pcell) radio link failure may be reported through the split SRB1. When the split SRB1 or the SRB3 has not been configured and there is an MCG Scell satisfying a predetermined condition, the MCG (or Pcell) radio link failure may be reported through the Scell. When the MCG radio link failure cannot be reported as described above, the terminal may trigger an RRC connection reestablishment procedure so as to reconfigure a connection.

When dual connectivity is configured (or carrier aggregation is configured) in a terminal when an MCG (or Pcell) radio link failure is detected,
if an SRB3 connected to an SCG base station is configured (or a split SRB1 is configured) in the terminal,
the terminal reports the MCG (or Pcell) radio link failure to the base station through the SRB3. The reporting may be performed as in the method (e.g. the second embodiment) proposed in the disclosure.
Otherwise (or if the SRB3 connected to the SCG base station is not configured and/or the split SRB1 is configured in the terminal)),
the terminal reports the MCG (or Pcell) radio link failure to the base station through the split SRB1. The reporting may be performed as in the method (e.g. the second embodiment) proposed in the disclosure. In another method, if carrier aggregation is configured in the terminal and an Scell satisfying a predetermined condition is configured, the MCG (or Pcell) radio link failure may be reported by duplicatedly transmitting an MCG (or Pcell) radio link failure message to an SCG and an Scell of an MCG through the split SRB1 using a packet duplication technology.
Otherwise (or if, when the MCG (or Pcell) radio link failure is detected, the SRB3 is not configured in the terminal, the split SRB1 is not configured, and/or the carrier aggregation is configured and an Scell satisfying a predetermined condition is configured (e.g. as in the fourth embodiment)),
the terminal reports the MCG (or Pcell) radio link failure to the base station through the Scell satisfying the predetermined condition. The reporting may be performed as in the method (e.g. the fourth embodiment) proposed in the disclosure.
Otherwise,
the terminal triggers an RRC connection reestablishment procedure so as to reconfigure a connection.

The following description is made of a (5-2)th embodiment in which the first embodiment, the second embodiment, the third embodiment, or the fourth embodiment proposed in the disclosure is performed under different conditions. The (5-2)th embodiment is characterized in that when an MCG (or Pcell) radio link failure is detected, if both dual connectivity and carrier aggregation have been configured in a terminal, the dual connectivity is first used to report the MCG (or Pcell) radio link failure. Further, (5-2)th embodiment is characterized in that when both an SRB3 and a split SRB1 have been configured in the dual connectivity, the MCG (or Pcell) radio link failure is reported through the split SRB1. The reason is that when a connection to an SCG base station operates normally, it may be determined that a connection to an SCG has higher reliability than a connection to an Scell of an MCG, and it may be determined that the split SRB1 directly connected to the MCG has lower transmission delay than the SRB3 connected to the SCG. When the split SRB1 has not been configured, the MCG (or Pcell) radio link failure may be reported through the SRB3. When the split SRB1 or the SRB3 has not been configured and there is an MCG Scell satisfying a predetermined condition, the MCG (or Pcell) radio link failure may be reported through the Scell. When the MCG radio link failure cannot be reported as described above, the terminal may trigger an RRC connection reestablishment procedure so as to reconfigure a connection.

When dual connectivity is configured (or carrier aggregation is configured) in a terminal when an MCG (or Pcell) radio link failure is detected,
if a split SRB1 connected to an SCG base station is configured (or an SRB3 is configured) in the terminal,
the terminal reports the MCG (or Pcell) radio link failure to the base station through the split SRB1. The reporting may be performed as in the method (e.g. the second embodiment) proposed in the disclosure. In another method, if carrier aggregation is configured in the terminal and an Scell satisfying a predetermined condition is configured, the MCG (or Pcell) radio link failure may be reported by duplicatedly transmitting an MCG (or Pcell) radio link failure message to an SCG and an Scell of an MCG through the split SRB1 using a packet duplication technology.
Otherwise (or if the split SRB1 connected to the SCG base station is not configured and/or the SRB3 is configured in the terminal)),
the terminal reports the MCG (or Pcell) radio link failure to the base station through the SRB3. The reporting may be performed as in the method (e.g. the second embodiment) proposed in the disclosure.
Otherwise (or if, when the MCG (or Pcell) radio link failure is detected, the SRB3 is not configured in the terminal, the split SRB1 is not configured, and/or the carrier aggregation is configured and an Scell satisfying a predetermined condition is configured (e.g. as in the fourth embodiment)),
the terminal reports the MCG (or Pcell) radio link failure to the base station through the Scell satisfying the predetermined condition. The reporting may be performed as in the method (e.g. the fourth embodiment) proposed in the disclosure.
Otherwise,
the terminal triggers an RRC connection reestablishment procedure so as to reconfigure a connection.

The following description is made of a (5-3)th embodiment in which the first embodiment, the second embodiment, the third embodiment, or the fourth embodiment proposed in the disclosure is performed under different conditions. The (5-3)th embodiment is characterized in that when an MCG (or Pcell) radio link failure is detected, if both dual connectivity and carrier aggregation have been configured in a terminal, the carrier aggregation is first used to report the MCG (or Pcell) radio link failure. Further, (5-3)th embodiment is characterized in that when there is no an MCG Scell satisfying the predetermined condition, and both an SRB3 and a split SRB1 have been configured in the dual connectivity, the MCG (or Pcell) radio link failure is reported through the split SRB1. The reason is that when a connection to an MCG base station operates normally, it may be determined that a Scell of an MCG has lower transmission delay, and it may be determined that the split SRB1 directly connected to the MCG has lower transmission delay than the SRB3 connected to an SCG. When the split SRB1 has not been configured, the MCG (or Pcell) radio link failure may be reported through the SRB3. When the split SRB1 or the SRB3 has not been configured and thus the MCG radio link failure cannot be reported as described above, the terminal may trigger an RRC connection reestablishment procedure so as to reconfigure a connection.

When carrier aggregation is configured (or dual connectivity is configured) in a terminal when an MCG (or Pcell) radio link failure is detected,
if an Scell satisfying a predetermined condition is configured when the MCG (or Pcell) radio link failure is detected (ex. as in the fourth embodiment),
the terminal reports the MCG (or Pcell) radio link failure to the base station through the Scell satisfying the predetermined condition. The reporting may be performed as in the method (e.g. the fourth embodiment) proposed in the disclosure. In another method, if dual connectivity is configured in the terminal and a split SRB1 is configured, the MCG (or Pcell) radio link failure may be reported by duplicatedly transmitting an MCG (or Pcell) radio link failure message to an SCG and a Scell of an MCG through the split SRB1 using a packet duplication technology.
Otherwise (or if there is no MCG Scell satisfying the predetermined condition in the terminal or if the split SRB1 connected to an SCG base station is configured (or if an SRB3 is configured)),
the terminal reports the MCG (or Pcell) radio link failure to the base station through the split SRB1. The reporting may be performed as in the method (e.g. the second embodiment) proposed in the disclosure.
Otherwise (or if there is no MCG Scell satisfying the predetermined condition in the terminal or if the split SRB1 connected to the SCG base station is not configured and/or the SRB3 is configured)),
the terminal reports the MCG (or Pcell) radio link failure to the base station through the SRB3. The reporting may be performed as in the method (e.g. the second embodiment) proposed in the disclosure.
Otherwise,
the terminal triggers an RRC connection reestablishment procedure so as to reconfigure a connection.

The following description is made of a (5-4)th embodiment in which the first embodiment, the second embodiment, the third embodiment, or the fourth embodiment proposed in the disclosure is performed under different conditions. The (5-4)th embodiment is characterized in that when an MCG (or Pcell) radio link failure is detected, if both dual connectivity and carrier aggregation have been configured in a terminal, the carrier aggregation is first used to report the MCG (or Pcell) radio link failure to a Scell. Further, (5-4)th embodiment is characterized in that when there is no an MCG Scell satisfying the predetermined condition, and both an SRB3 and a split SRB1 have been configured in the dual connectivity, the MCG (or Pcell) radio link failure is reported through the SRB3. The reason is that when a connection to an MCG base station operates normally, it may be determined that a Scell of an MCG has lower transmission delay, and it may be determined that the SRB3 connected to an SCG has higher reliability than the split SRB1 directly connected to the MCG. When the SRB3 has not been configured, the MCG (or Pcell) radio link failure may be reported through the split SRB1. When the split SRB 1 or the SRB3 has not been configured and thus the MCG radio link failure cannot be reported as described above, the terminal may trigger an RRC connection reestablishment procedure so as to reconfigure a connection.

When carrier aggregation is configured (or dual connectivity is configured) in a terminal when an MCG (or Pcell) radio link failure is detected,
if an Scell satisfying a predetermined condition is configured when the MCG (or Pcell) radio link failure is detected (ex. as in the fourth embodiment),
the terminal reports the MCG (or Pcell) radio link failure to the base station through the Scell satisfying the predetermined condition. The reporting may be performed as in the method (e.g. the fourth embodiment) proposed in the disclosure. In another method, if dual connectivity is configured in the terminal and a split SRB1 is configured, the MCG (or Pcell) radio link failure may be reported by duplicatedly transmitting an MCG (or Pcell) radio link failure message to an SCG and a Scell of an MCG through the split SRB1 using a packet duplication technology.
Otherwise (or if there is no MCG Scell satisfying the predetermined condition in the terminal or if the SRB3 connected to an SCG base station is configured (or if a split SRB1 is configured)),
the terminal reports the MCG (or Pcell) radio link failure to the base station through the SRB3. The reporting may be performed as in the method (e.g. the second embodiment) proposed in the disclosure.
Otherwise (or if there is no MCG Scell satisfying the predetermined condition in the terminal or if the SRB3 connected to the SCG base station is not configured and/or the split SRB1 is configured)),
the terminal reports the MCG (or Pcell) radio link failure to the base station through the split SRB1. The reporting may be performed as in the method (e.g. the second embodiment) proposed in the disclosure.
Otherwise,
the terminal triggers an RRC connection reestablishment procedure so as to reconfigure a connection.

The SRB3 refers to an encoded bearer and is a bearer which is configured in an SCG of the terminal and through which the terminal can directly an RRC message to the SCG base station via an SCG MAC layer device. The SCG base station may deliver the RRC message received through the SRB3 to an MCG. The split SRB1 refers to an SRB in which one PDCP layer device is connected to an MCG or an SCG, two RLC layer devices is connected to the one PDCP layer device and performs data transmission/reception, one RLC layer device is connected to an MCG MAC layer device, the other RLC layer device is connected to an SCG MAC layer device. The PDCP layer device may be configured for the MCG. Therefore, when the terminal transmit an RRC message to the MCG RLC layer device at the time of transmit the RRC message through the split SRB1, the RRC message is directly transmitted to an MCG base station through the MCG MAC layer device. When the terminal transmits an RRC message to an SCG RLC layer device, the RRC message may be transmitted to the MCG base station through the SCG base station. The RRC message may be transmitted to the MCG RLC layer device or the SCG RLC layer device by using packet duplication.

The following description is made of a (5-5)th embodiment in which the first embodiment, the second embodiment, the third embodiment, or the fourth embodiment proposed in the disclosure is performed under different conditions. The (5-5)th embodiment is characterized in that when an MCG (or Pcell) radio link failure is detected, if both dual connectivity and carrier aggregation have been configured in a terminal, the dual connectivity is first used to report the MCG (or Pcell) radio link failure. Further, (5-5)th embodiment is characterized in that when both an SRB3 and a split SRB1 have been configured in the dual connectivity, the MCG (or Pcell) radio link failure is reported through the SRB3 or the split SRB1. The reason is that when a connection to an SCG base station operates normally, it may be determined that a connection to an SCG has higher reliability than a connection to a Scell of an MCG. When the split SRB1 or the SRB3 has not been configured and there is an MCG Scell satisfying a predetermined condition, the MCG (or Pcell) radio link failure may be reported through the Scell. When the MCG radio link failure cannot be reported as described above, the terminal may trigger an RRC connection reestablishment procedure so as to reconfigure a connection.

When dual connectivity is configured (or carrier aggregation is configured) in a terminal when an MCG (or Pcell) radio link failure is detected,
  if an SRB3 connected to an SCG base station is configured (or a split SRB1 is configured) in the terminal,
    the terminal reports the MCG (or Pcell) radio link failure to the base station through the SRB3 or the split SRB1. The reporting may be performed as in the method (e.g. the second embodiment) proposed in the disclosure. In another method, if carrier aggregation is configured in the terminal and a Scell satisfying a predetermined condition is configured, the MCG (or Pcell) radio link failure may be reported by duplicatedly transmitting an MCG (or Pcell) radio link failure message to an SCG and a Scell of an MCG through the split SRB1 using a packet duplication technology.
  Otherwise (or if, when the MCG (or Pcell) radio link failure is detected, the SRB3 is not configured in the terminal in the terminal, the split SRB1 is not configured, and/or the carrier aggregation is configured and a Scell satisfying a predetermined condition is configured (e.g. as in the fourth embodiment)),
    the terminal reports the MCG (or Pcell) radio link failure to the base station through the Scell satisfying the predetermined condition. The reporting may be performed as in the method (e.g. the fourth embodiment) proposed in the disclosure.
  Otherwise,
    the terminal triggers an RRC connection reestablishment procedure so as to reconfigure a connection.

In the methods proposed in the disclosure, when an MCG (or Pcell) radio link failure is detected, the terminal reports the radio link failure via an SRB3 or a split SRB1 by using dual connectivity or reports the radio link failure via an MCG Scell satisfying a predetermined condition by using carrier aggregation. However, when the first timer or the second timer proposed above has expires (e.g. when an RRC message corresponding to MCG radio link failure reporting is not received from a base station until the timer expires), the terminal may trigger an RRC connection reestablishment procedure so as to reconfigure a connection.

As described, when the MCG (or Pcell) radio link failure is detected, the terminal reports the radio link failure via an SRB3 or a split SRB1 by using dual connectivity or reports the radio link failure via an Scell of an MCG satisfying a predetermined condition by using carrier aggregation. At this time, when the base station indicates, using an indicator through an RRC message, that the base station can perform or support an MCG radio link failure recovery function or the base station broadcasts that the MCG radio link failure recovery function is supported in system information, the terminal may report an MCG radio link failure according to the methods proposed in the disclosure based on the priority thereof when the MCG radio link failure occurs. In the case in which the base station has determined through a terminal capability reporting message that the terminal capability supports an MCG radio link failure recovery function, by using an indicator through an RRC message, the base station may configure, for the terminal, whether the MCG radio link failure recovery method proposed in the disclosure can be applied at the time of occurrence of an MCG radio link failure when the base station configures dual connectivity or carrier aggregation for the terminal or when the base station performs bearer configuration through an RRC message.

In another method, in the case in which the base station has determined through a terminal capability reporting message that the terminal capability supports an MCG radio link failure recovery function, the base station may inform, through an RRC message and an indicator defined for each bearer or each type of cell configuration information, the terminal of a bearer (e.g. split SRB1 or SRB3) through which an MCG (or Pcell) radio link failure is reported at the time of occurrence of the MCG radio link failure or an Scell (e.g. one Scell or multiple Scells) among cells in which a PUCCH is configured) through which an MCG (or Pcell) radio link failure is reported at the time of occurrence of the MCG radio link failure when the base station configures dual connectivity or carrier aggregation for the terminal or when the base station performs bearer configuration through an RRC message. For example, the base station configures dual connectivity for the terminal through an RRC message (e.g. an RRCReconfiguration message), and, when configuring a split SRB1, may indicate through an indicator whether the MCG radio link failure recovery method proposed in the disclosure can be used for the split SRB1 to be configured. For example, the base station configures dual connectivity for the terminal through an RRC message (e.g. an RRCReconfiguration message), and, when configuring an SRB3, may indicate through an indicator whether the MCG radio link failure recovery method proposed in the disclosure can be used for the SRB3 to be configured. For example, the base station configures dual connectivity for the terminal through an RRC message (e.g. an RRCReconfiguration message), and, when configuring a split SRB1 and an SRB3, with respect to the split SRB1 and SRB3 to be configured, the base station may determine whether the MCG radio link failure recovery method proposed in the disclosure can be used in the split SRB1 or can be used in the SRB3, and may indicate the determination through an indicator. When the MCG radio link failure recovery method is supported in the case of both the split SRB1 and the SRB3 are configured, the base station may designate one thereof and determine the terminal to report the MCG radio link failure. In another method, the base station configures dual connectivity for the terminal through an RRC message (e.g. an RRCReconfiguration message), and, when configuring a split SRB1 and an SRB3, with respect to the split SRB1 and SRB3 to be configured, the base station may indicate through indicators, whether the MCG radio link failure recovery method proposed in the disclosure can be used in the split SRB1 or can be used in the SRB3, respectively. When the base station indicates that the MCG radio link failure recovery method can be used in both the split SRB1 and the SRB3, the terminal may select the split SRB1 or the SRB3 by implementation (e.g. selection of a bearer connected to an MAC layer device or a cell in which the strength of a signal is stronger) and may report an MCG radio link failure through the selected split SRB1 or the SRB3 when the MCG radio link failure occurs.

For example, the base station configures carrier aggregation for the terminal through an RRC message (e.g. an RRCReconfiguration message), and, when configuring multiple Scells, may determine whether the MCG radio link failure recovery method proposed in the disclosure can be used in each Scell with respect to the Scells to be configured and may indicate the determination through an indicator. Further, base station may designate one Scell and determine the terminal to report an MCG radio link failure through the designate Scell. In another method, the base station configures carrier aggregation for the terminal through an RRC message (e.g. an RRCReconfiguration message), and, when configuring multiple Scells, may indicate, through an indicator, whether the MCG radio link failure recovery method proposed in the disclosure can be used in each Scell with respect to the Scells to be configured. When the base station indicates through an indicator that the MCG radio link failure recovery method can be used in the multiple Scells, the terminal may select one Scell from among the multiple Scells, in which the MCG radio link failure recovery method can be used, by implementation (e.g. selection of an Scell connected to an MAC layer device or a cell in which the strength of a signal is stronger, or an Scell satisfying a predetermined condition (e.g. the first condition) and may report an MCG radio link failure through the selected Scell when the MCG radio link failure occurs.

For example, the base station configures carrier aggregation for the terminal through an RRC message (e.g. an RRCReconfiguration message), and, when configuring multiple Scells, a split SRB1, or an SRB3, may determine whether the MCG radio link failure recovery method proposed in the disclosure can be used in each Scell, the split SRB1, or the SRB3 with respect to the Scells, the split SRB1, or the SRB3 to be configured and may indicate the determination through an indicator. Further, base station may designate one Scell, the split SRB1, or the SRB3 and may determine the terminal to report an MCG radio link failure through the Scell, the split SRB1, or the SRB3 which has been designated. In another method, the base station configures carrier aggregation for the terminal through an RRC message (e.g. an RRCReconfiguration message), and, when configuring multiple Scells, a split SRB1, or an SRB3, may determine whether the MCG radio link failure recovery method proposed in the disclosure can be used in each Scell, the split SRB1, or the SRB3 with respect to the Scells, the split SRB 1, or the SRB3 to be configured, respectively. When the base station indicates that the MCG radio link failure recovery method proposed in the disclosure can be used in each Scell, the split SRB1, or the SRB3, the terminal may select one Scell from among the multiple Scells, the split SRB1, or the SRB3, in which the MCG radio link failure recovery method can be used, by implementation (e.g. selection of an Scell or bearer (split SRB1 or SRB3) connected to an MAC layer device or a cell in which the strength of a signal is stronger, or an Scell or bearer (split SRB1 or SRB3) satisfying a predetermined condition (e.g. the first condition, the second condition, the third condition, the fourth condition, the fifth condition, or the sixth condition) and may report an MCG radio link failure through the selected Scell when the MCG radio link failure occurs.

When the terminal determines that an MCG radio link failure has occurred according to the method proposed in the disclosure, the terminal may include, in an RRC message (e.g. a ULInformationTransferMRDC message or a Failure-Information message), information indicating that the MCG radio link failure has occurred and transmit the RRC message through a split SRB1, an SRB3, or an Scell such that the base station (an MCG or an SCG) can identify the MCG radio link failure of the terminal. When the MCG radio link failure of the terminal, in response thereto, the base station (the MCG or the SCG) may generate an RRC message (e.g. an RRCReconfiguration message or an RRCRelease message) and transmit the RRC message to the terminal. When the SCG base station transmits a response RRC message (e.g. the RRCReconfiguration message or the RRCRelease message) generated by the MCG base station, the SCG base station may deliver, to the terminal, another RRC message (e.g. a DLInformationTranferMRDC message) including the response RRC message. When the terminal receives an RRCReconfiguration message (an RRC message received from the MCG base station or the SCG base station through the split SRB1 or the SRB3) as a response message in response to MCG radio link failure reporting, the terminal may complete the application of configuration information of the received message and then may transmit an RRCReconfigurationComplete message again to the MCG base station or the SCG base station through the split SRB1 or the SRB3 in response to the RRCReconfiguration message. When the RRCReconfiguration message indicates handover or an access to another cell, the terminal may complete random access to the cell and transmit an RRCReconfigurationComplete message through an SRB1. However, when the terminal receives an RRCRelease message (an RRC message received from the MCG base station or the SCG base station through the split SRB1 or the SRB3) as a response message in response to MCG radio link failure reporting, the terminal may switch to an RRC idle mode or to an RRC inactive mode according to configuration information indicated by the RRCRelease message, but may not transmit an additional response to the RRC message to the base station.

Figure 1I:
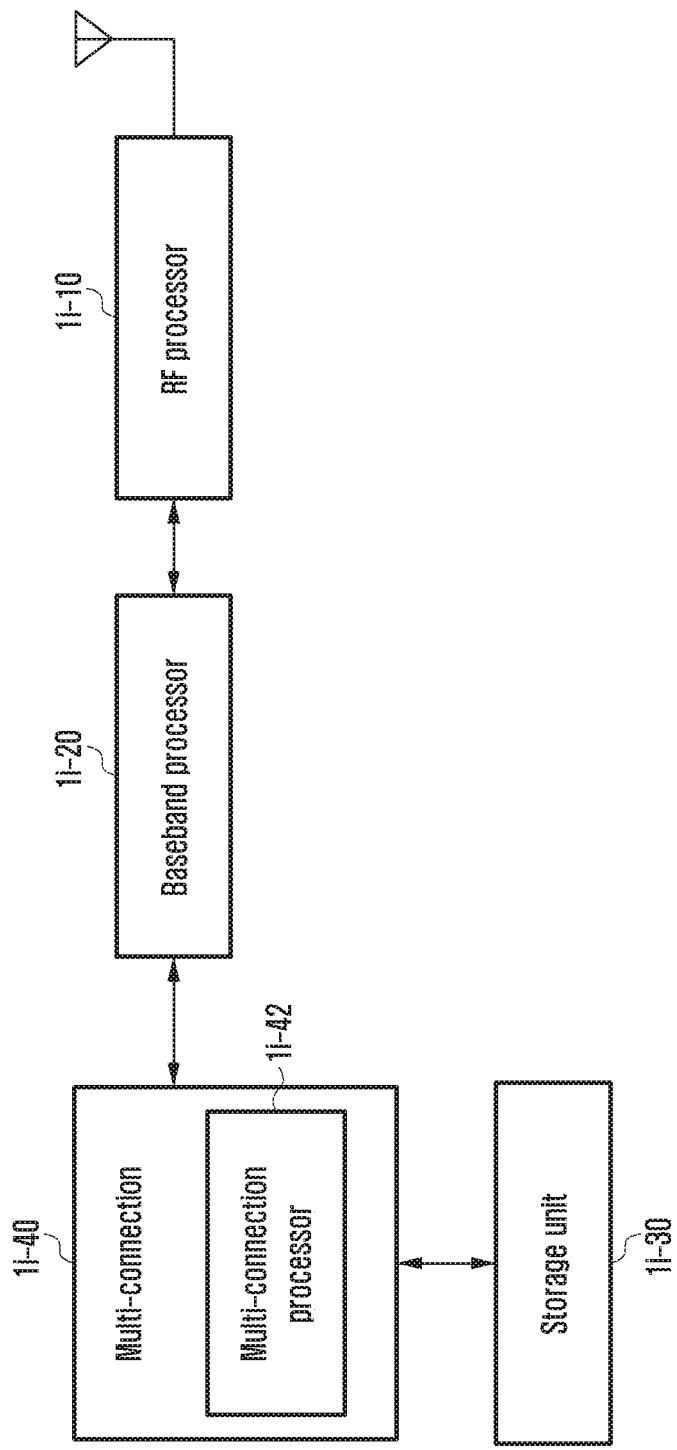
FIG. 1I illustrates a structure of a terminal to which an embodiment can be applied according to an embodiment of the disclosure.

FIG. 1I illustrates a structure of a terminal to which an embodiment can be applied according to an embodiment of the disclosure.

Referring to FIG. 1I, the terminal includes a radio frequency (RF) processor 1$i$-10, a baseband processor 1$i$-20, a storage unit 1$i$-30, and a controller 1$i$-40.

The RF processor 1$i$-10 performs a function, such as signal band conversion and signal amplification, for transmitting/receiving a signal through a wireless channel. That is, the RF processor 1$i$-10 up-converts a baseband signal provided from the baseband processor 1$i$-20 to an RF band signal and transmits the RF band signal via an antenna, and down-converts an RF band signal received via the antenna to a baseband signal. For example, the RF processor 1$i$-10 may include a transmission filter, a reception filter, an amplifier, a mixer, an oscillator, a digital-to-analog converter (DAC), an analog-to-digital convertor (ADC), etc. In FIG. 1I, only one antenna is illustrated. However, the terminal may include multiple antennas. Further, the RF processor 1$i$-10 may include multiple RF chains. The RF processor 1$i$-10 may perform beamforming. For the beamforming, the RF processor 1$i$-10 may adjust the phase and magnitude of each of signals transmitted/received through multiple antennas or antenna elements. Further, the RF processor may perform MIMO and may receive multiple layers while the MIMO is performed. The RF processor 1$i$-10 may appropriately configure the multiple antennas or antenna elements according to control of the controller so as to perform reception beam sweeping or adjust a beam direction and a beam width such that a reception beam matches a transmission beam.

The baseband processor 1i-20 performs a conversion between a baseband signal and a bitstream according to the physical layer specification of a system. For example, at the time of data transmission, the baseband processor 1i-20 encodes and modulates a transmission bitstream to generate complex symbols. Further, at the time of data reception, the baseband processor 1i-20 reconstructs a reception bitstream by demodulating and decoding a baseband signal provided from the RF processor 1i-10. For example, according to an orthogonal frequency division multiplexing (OFDM) scheme, at the time of data transmission, the baseband processor 1i-20 encodes and modulates a transmission bitstream to generate complex symbols, maps the complex symbols to subcarriers, and forms OFDM symbols through inverse fast Fourier transform (IFFT) operation and cyclic-prefix (CP) insertion. Further, at the time of data reception, baseband processor 1i-20 divides a baseband signal provided from the RF processor 1i-10 into OFDM symbol units, reconstructs signals mapped to subcarriers through fast Fourier transform (FFT) operation, and reconstructs a reception bitstream through demodulating and decoding.

The RF processor 1i-10 and the baseband processor 1i-20 transmit and receive a signal, as described above. Thus, each of the RF processor 1i-10 and the baseband processor 1i-20 may be called a transmission unit, a reception unit, a transmission/reception unit, or a communication unit. Furthermore, at least one of the RF processor 1i-10 and the baseband processor 1i-20 may include multiple communication modules in order to support multiple different radio access technologies. Further, at least one of the RF processor 1i-10 and the baseband processor 1i-20 may include different communication modules in order to process signals in different frequency bands. For example, the different radio access technologies may include an LTE network, an NR network, etc. Further, the different frequency bands may include a super high frequency (SHF) (e.g. 2.5 GHz, 5 GHz) band and a millimeter wave (mm Wave) (e.g. 60 GHz) band.

The storage unit 1i-30 stores data, such as default programs, application programs, configuration information, etc. for an operation of the terminal. The storage unit 1i-30 provides the stored data in response to a request made by the controller 1i-40.

The controller 1i-40 controls overall operations of the terminal. For example, the controller 1i-40 transmits/receives a signal via the baseband processor 1i-20 and the RF processor 1i-10. Further, the controller 1i-40 records and reads to/from the storage unit 1i-30. To this end, the controller 1i-40 may include at least one processor. For example, the controller 1i-40 may include a communication processor (CP) for controlling communication and an application processor (AP) for controlling an upper layer such as an application program.

Figure 1J:
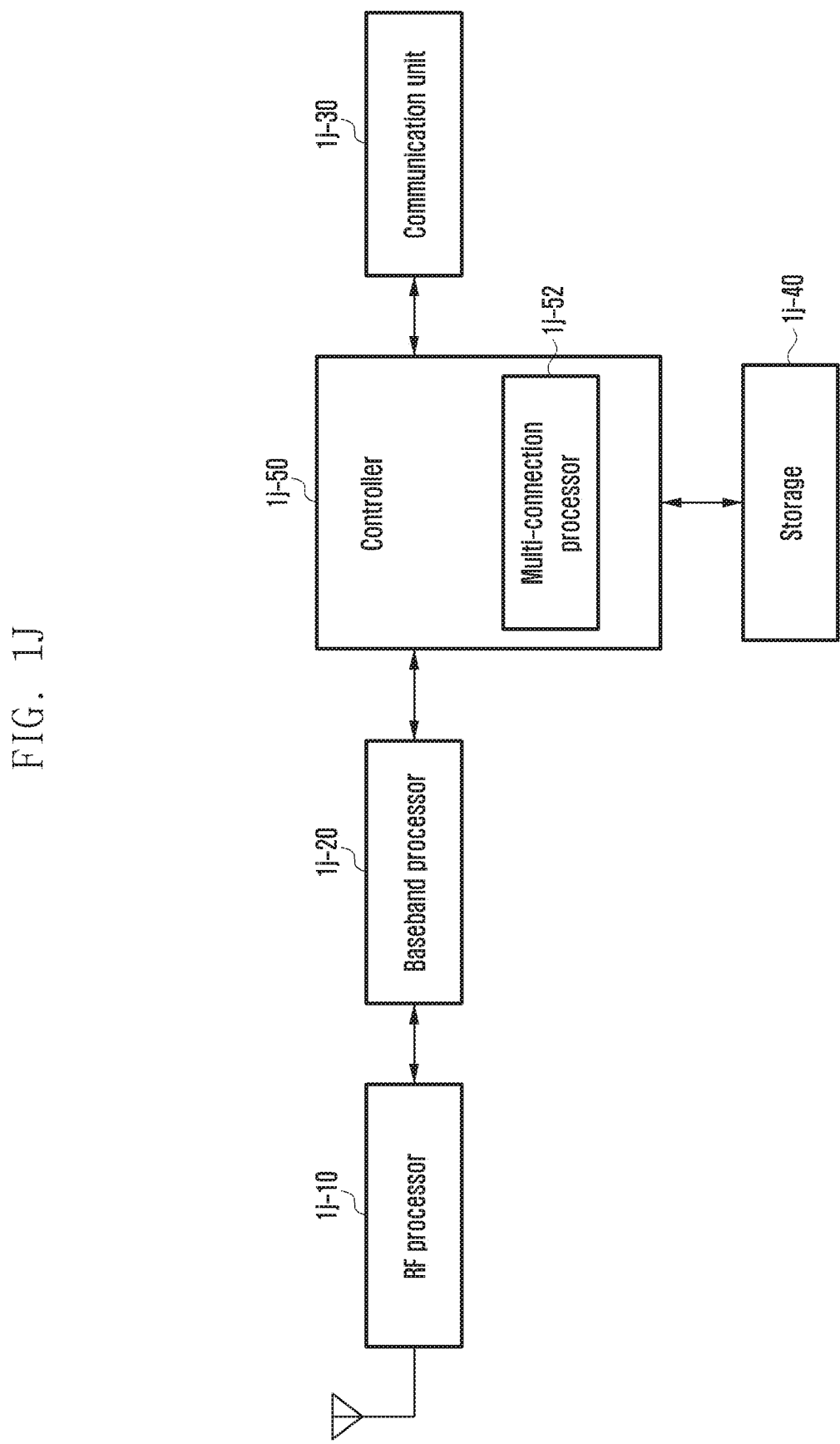
FIG. 1J illustrates a block configuration of TRP in a wireless communication system to which an embodiment can be applied according to an embodiment of the disclosure.

FIG. 1J illustrates a block configuration of TRP in a wireless communication system to which an embodiment can be applied according to an embodiment of the disclosure.

Referring to FIG. 1J, the base station includes an RF processor 1j-10, a baseband processor 1j-20, a backhaul communication unit 1j-30, a storage unit 1j-40, and a controller 1j-50.

The RF processor 1j-10 performs a function, such as signal band conversion and signal amplification, for transmitting/receiving a signal through a wireless channel. That is, the RF processor 1j-10 up-converts a baseband signal provided from the baseband processor 1j-20 to an RF band signal and transmits the RF band signal via an antenna, and down-converts an RF band signal received via the antenna to a baseband signal. For example, the RF processor 1j-10 may include a transmission filter, a reception filter, an amplifier, a mixer, an oscillator, a DAC, an ADC, etc. In FIG. 1J, only one antenna is illustrated. However, the first access node may include multiple antennas. Further, the RF processor 1j-10 may include multiple RF chains. The RF processor 1j-10 may perform beamforming. For the beamforming, the RF processor 1j-10 may adjust the phase and magnitude of each of signals transmitted/received through multiple antennas or antenna elements. The RF processor may transmit one or more layers to perform a downlink MIMO operation.

The baseband processor 1j-20 performs a conversion between a baseband signal and a bitstream according to the physical layer specification of a first radio access technology. For example, at the time of data transmission, the baseband processor 1j-20 encodes and modulates a transmission bitstream to generate complex symbols. Further, at the time of data reception, the baseband processor 1j-20 reconstructs a reception bitstream by demodulating and decoding a baseband signal provided from the RF processor 1j-10. For example, according to an OFDM scheme, at the time of data transmission, the baseband processor 1j-20 encodes and modulates a transmission bitstream to generate complex symbols, maps the complex symbols to subcarriers, and forms OFDM symbols through IFFT operation and CP insertion. Further, at the time of data reception, baseband processor 1j-20 divides a baseband signal provided from the RF processor 1j-10 into OFDM symbol units, reconstructs signals mapped to subcarriers through FFT operation, and reconstructs a reception bitstream through demodulating and decoding. The RF processor 1j-10 and the baseband processor 1j-20 transmit and receive a signal, as described above. Thus, each of the RF processor 1j-10 and the baseband processor 1j-20 may be called a transmission unit, a reception unit, a transmission/reception unit, a communication unit, or a wireless communication unit.

The backhaul communication unit 1j-30 provides an interface for communicating with other nodes within a network.

The storage unit 1j-40 stores data, such as default programs, application programs, configuration information, etc. for an operation of the main base station. Particularly, the storage unit 1j-40 may store information regarding a bearer allocated to a connected terminal, a measurement result reported from the connected terminal. Further, the storage unit 1j-40 may provide multiple connections to a terminal or may provide information which is a reference used to determine whether to stop the connections. Further, the storage unit 1j-40 provides the stored data in response to a request made by the controller 1j-50.

The controller 1j-50 controls overall operations of the main base station. For example, the controller 1j-50 transmits/receives a signal via the baseband processor 1j-20 and the RF processor 1j-10 or via the backhaul communication unit 1j-30. Further, the controller 1j-50 records and reads data to and from the storage unit 1j-40. To this end, the controller 1j-50 may include at least one processor.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method by a terminal in a wireless communication system, the method comprising:
   detecting a radio link failure for a master cell group (MCG);
   transmitting, to a secondary cell group (SCG), an MCG radio link failure report via a split signaling radio bearer (SRB)1 or an SRB3 in case that the MCG radio link failure is detected; and
   starting a timer in case that the MCG radio link failure report is transmitted to the SCG,
   wherein the MCG radio link failure report is transmitted via the split SRB1, in case that both the split SRB1 and the SRB3 are configured for the terminal, and
   wherein a configuration is changed from a secondary radio link control (RLC) entity associated with the split SRB1 to a primary RLC entity associated with the split SRB1, in case that the MCG radio link failure report is transmitted via the split SRB1 and a packet data convergence protocol (PDCP) duplication is not configured.

2. The method of claim 1, further comprising:
   stopping the timer in case that a response is received from the MCG.

3. The method of claim 1, further comprising:
   triggering a radio resource control (RRC) connection re-establishment procedure in case that the timer expires.

4. The method of claim 1, further comprising:
   triggering a radio resource control (RRC) connection re-establishment procedure in case that a radio link failure for the SCG is detected while the MCG transmission is suspended.

5. A method by a secondary cell group (SCG) in a wireless communication system, the method comprising:
   receiving, from a terminal, a master cell group (MCG) radio link failure report via a split signaling radio bearer (SRB)1 or an SRB3, in case that the radio link failure for the MCG is detected,
   wherein a timer is started by the terminal in case that the MCG radio link failure report is received from the terminal, and
   wherein the MCG radio link failure report is received via the split SRB1 in case that both the split SRB1 and the SRB3 are configured for the terminal, and
   wherein a configuration is changed from a secondary radio link control (RLC) entity associated with the split SRB1 to a primary RLC entity associated with the split SRB1, in case that the MCG radio link failure report is transmitted via the split SRB1 and a packet data convergence protocol (PDCP) duplication is not configured.

6. The method of claim 5, wherein the timer is stopped by the terminal in case that the terminal receives a response from an MCG.

7. The method of claim 5, wherein a radio resource control (RRC) connection re-establishment procedure is triggered in case that the timer expires.

8. The method of claim 5, wherein a radio resource control (RRC) connection re-establishment procedure is triggered in case that a radio link failure for the SCG is detected while the MCG transmission is suspended.

9. A terminal comprising:
   a transceiver to transmit and receive at least one signal; and
   at least one processor coupled to the transceiver, and configured to:
      detect a radio link failure for a master cell group (MCG),
      control the transceiver to transmit, to a secondary cell group (SCG), an MCG radio link failure report via a split signaling radio bearer (SRB)1 or an SRB3 in case that the MCG radio link failure is detected, and
      control a timer to start in case that the MCG radio link failure report is transmitted to the SCG,
   wherein the MCG radio link failure report is transmitted via the split SRB1, in case that both the split SRB1 and the SRB3 are configured for the terminal, and
   wherein a configuration is changed from a secondary radio link control (RLC) entity associated with the split SRB1 to a primary RLC entity associated with the split SRB1, in case that the MCG radio link failure report is transmitted via the split SRB1 and a packet data convergence protocol (PDCP) duplication is not configured.

10. The terminal of claim 9, wherein the at least one processor is further configured to stop the timer in case that a response is received from the MCG.

11. The terminal of claim 9, wherein the at least one processor is further configured to trigger a radio resource control (RRC) connection re-establishment procedure in case that the timer expires.

12. The terminal of claim 9, wherein the at least one processor is further configured to trigger a RRC connection re-establishment procedure in case that a radio link failure for the SCG is detected while the MCG transmission is suspended.

13. A secondary cell group (SCG) comprising:
   a transceiver to transmit and receive at least one signal; and
   at least one processor coupled to the transceiver, and configured to:
      receive, from a terminal, a master cell group (MCG) radio link failure report via a split signaling radio bearer (SRB)1 or an SRB3, in case that a radio link failure for an MCG is detected, and
      control a timer to be started by the terminal in case that the MCG radio link failure report is received from the terminal,
   wherein the MCG radio link failure report is received via the split SRB1 in case that both the split SRB1 and the SRB3 are configured for the terminal, and
   wherein a configuration is changed from a secondary radio link control (RLC) entity associated with the split SRB1 to a primary RLC entity associated with the split SRB1, in case that the MCG radio link failure report is transmitted via the split SRB1 and a packet data convergence protocol (PDCP) duplication is not configured.

14. The SCG of claim 13, wherein the timer is stopped by the terminal in case that the terminal receives a response from an MCG.

15. The SCG of claim 13, wherein a radio resource control (RRC) connection re-establishment procedure is triggered in case that the timer expires.

16. The SCG of claim 13, wherein a radio resource control (RRC) connection re-establishment procedure is triggered in case that a radio link failure for the SCG is detected while the MCG transmission is suspended.

* * * * *